United States Patent
Ezenyilimba et al.

(10) Patent No.: US 7,906,453 B2
(45) Date of Patent: Mar. 15, 2011

(54) PROCESSES FOR CONTROLLING CATALYST PARTICLE MORPHOLOGY

(75) Inventors: Matthew Ezenyilimba, Sandia Park, NM (US); Paolina Atanassova, Albuquerque, NM (US); Yipeng Sun, Albuquerque, NM (US); Gordon Rice, Albuquerque, NM (US); James Brewster, Rio Rancho, NM (US)

(73) Assignee: Cabot Corporation, Boston, MA (US)

( * ) Notice: Subject to any disclaimer, the term of this patent is extended or adjusted under 35 U.S.C. 154(b) by 460 days.

(21) Appl. No.: 11/969,573

(22) Filed: Jan. 4, 2008

(65) Prior Publication Data
US 2009/0176644 A1 Jul. 9, 2009

(51) Int. Cl.
*B01J 21/18* (2006.01)
*B01J 23/00* (2006.01)
*B01J 23/32* (2006.01)
*B01J 23/02* (2006.01)
*B01J 23/04* (2006.01)

(52) U.S. Cl. ......... 502/185; 502/182; 502/305; 502/324; 502/325; 502/344; 502/350; 502/353

(58) Field of Classification Search .......... 502/182, 502/185, 305, 324, 325, 344, 350, 353
See application file for complete search history.

(56) References Cited

U.S. PATENT DOCUMENTS

| | | | |
|---|---|---|---|
| 6,464,750 B1 * | 10/2002 | Tailhades et al. | 75/246 |
| 2007/0160899 A1 | 7/2007 | Atanassova et al. | |
| 2008/0206616 A1 * | 8/2008 | Atanassova et al. | 429/30 |

FOREIGN PATENT DOCUMENTS

| | | |
|---|---|---|
| WO | 2004/095603 A2 | 11/2004 |
| WO | 2005/069767 A2 | 8/2005 |
| WO | 2007/125159 A1 | 11/2007 |

OTHER PUBLICATIONS

Transmittal; Written Opinion of the International Searching Authority; and International Search Report for International Application No. PCT/US2008/078581 with a mailing date of Mar. 27, 2009.
U.S. Appl. No. 11/687,293, filed Mar. 16, 2007.
U.S. Appl. No. 11/697,758, filed Feb. 27, 2007.
U.S. Appl. No. 11/534,561, filed Sep. 22, 2006.

* cited by examiner

Primary Examiner — Patricia L Hailey

(57) ABSTRACT

Processes for forming catalyst particles utilizing a defoamer are described. Also described are processes for forming catalysts, where the processes comprise providing a correlation between defoamer concentration and catalyst particle morphology, and determining an amount of defoamer to include in a precursor composition to obtain the target morphology based on the correlation.

39 Claims, 20 Drawing Sheets

PROCESSES FOR CONTROLLING CATALYST PARTICLE MORPHOLOGY

BACKGROUND OF THE INVENTION

1. Field of the Invention

The present invention relates to processes for producing catalyst particles. In particular, the invention relates to processes for forming catalyst particles, which processes afford excellent control of the morphology of the catalyst particles.

2. Discussion of Background Information

Carbon black is a particulate form of carbon commonly produced by thermal cracking or decomposition of a hydrocarbon raw material. More than 90 percent of carbon black is produced using an oil furnace process, which involves injecting an aromatic petroleum distillate into a preheated, closed furnace, and then cooling and collecting the carbon aggregates that have been formed. By controlled manipulation of reactor conditions, it is possible to vary particle size, aggregate size, and surface chemistry to create a broad range of carbon black properties.

Carbon black may be used, for example, in water-based systems to provide pigmentation, UV resistance, and conductivity. Carbon blacks have also found wide application as the support phase of catalyst particles, such as catalyst particles used in fuel cell membrane electrode assemblies (MEAs). In this application, a catalytically active phase is disposed on the carbon black particles. The morphology (i.e., the structure, form, or shape) and surface area characteristics of the carbon black support phase are characteristics that have a critical impact on the performance of the catalyst particles. The morphology of the catalyst that develops as the catalyst particles are formed has a strong influence, for example, on the packing density of supported catalyst particles. The packing density, in turn, impacts transportability of the reactants and products to and from, respectively, the active phase of the catalyst particles in an MEA. Generally, the greater the packing density, the more difficult it is for reactants and products to move through a fuel cell MEA. The surface area determines the type and number of surface adsorption centers where the catalytically active phase is formed. Catalyst morphology is difficult to control using known methods for catalyst synthesis. Such lack of control of catalyst morphology presents a major obstacle for the development of energy storage and production devices that contain such catalysts. Thus, the need exists for processes for forming carbon black supported catalyst particles where the morphology and surface area of the catalyst particles can be predicted and controlled.

SUMMARY OF THE INVENTION

The present invention relates to processes for forming catalyst particles having a desired tap density and/or morphology. In one aspect, the invention is to a process for forming catalyst particles having a tap density less than 0.80 g/m$^3$, e.g., less than 0.70 g/m$^3$, less than 0.65 g/m$^3$, less than 0.60 g/m$^3$, less than 0.50 g/m$^3$, or less than 0.40 g/m$^3$, the process comprising the steps of: (a) providing a precursor composition comprising support particles, an active phase precursor, a vehicle and less than about 2 weight percent defoamer, based on the total weight of the precursor composition; (b) aerosolizing the precursor composition to form a flowing stream of droplets; and (c) heating the flowing stream of droplets under conditions effective to vaporize the vehicle and form the catalyst particles, wherein the catalyst particles comprise an active phase disposed on the support particles, e.g., carbon support particles.

In another embodiment, the invention is directed to a process for forming catalyst particles having a target morphology, the process comprising the steps of: (a) providing a correlation between defoamer concentration and catalyst particle morphology; (b) determining an amount of defoamer to include in a precursor composition to obtain the target morphology based on the correlation; (c) preparing a precursor composition comprising support particles, an active phase precursor, a vehicle and a defoamer, wherein the amount of defoamer included in the precursor composition is determined in the determining step; (d) aerosolizing the precursor composition to form a flowing stream of droplets; and (e) heating the flowing stream of droplets under conditions effective to vaporize the vehicle and form the catalyst particles, wherein the catalyst particles comprise an active phase disposed on the support particles and have the target morphology.

The precursor composition optionally comprises the defoamer in an amount less than about 1.2 weight percent, less than about 0.8 weight percent, less than about 0.5 weight percent, or may be substantially free of defoamer. In terms of ranges, the precursor composition optionally comprises the defoamer in an amount greater than about 0.01 weight percent and less than about 2 weight percent, e.g., in an amount greater than about 0.01 weight percent and less than about 1 weight percent. Exemplary defoamers include Surfynol DF 110D, a polyglycol, and polyols.

The catalyst particles optionally have a BET nitrogen surface area of from about 200 to about 500 m$^2$/g.

Optionally, the precursor composition further comprises a dispersant, which may comprise methylcellulose.

The catalyst particles may be suitable for use in as a hydrogen/air fuel cell catalyst or a direct methanol fuel cell.

The support particles optionally comprise carbon black, e.g., a carbon black selected from Vulcan XC72, Vulcan XC605, Monarch 700, Monarch 1100 and Ketjen Black EC600.

The active phase precursor optionally comprises a metal-containing compound comprising a metal selected from the group consisting of nickel, cobalt, iron, copper, manganese, chromium, ruthenium, rhenium, molybdenum, tungsten, vanadium, zinc, titanium, zirconium, tantalum, iridium, platinum, palladium and gold.

Optionally, the precursor composition is high shear mixed prior to the aerosolizing.

In another embodiment, the invention is to a process for forming catalyst particles having a tap density greater than 0.65 g/m$^3$, e.g., greater than 0.75 g/m$^3$, or greater than 0.85 g/m$^3$, the process comprising the steps of: (a) providing a precursor composition comprising support particles, an active phase precursor, a vehicle and at least about 2 weight percent defoamer, e.g., at least about 4, at least about 6, at least about 8 or at least about 10 weight percent defoamer, based on the total weight of the precursor composition; (b) aerosolizing the precursor composition to form a flowing stream of droplets; and (c) heating the flowing stream of droplets under conditions effective to vaporize the vehicle and form the catalyst particles, wherein the catalyst particles comprise an active phase disposed on the support particles.

BRIEF DESCRIPTION OF THE DRAWINGS

The present invention will be better understood in view of the following non-limiting figures, wherein.

DETAILED DESCRIPTION OF THE PRESENT INVENTION

Introduction

Figure 1:
FIG. 1 presents a scanning electron micrograph (SEM) the catalyst particles made according to the process described in Example 1.

The present invention relates to forming catalyst particles having a desired morphology and/or tap density from a precursor composition in an aerosol-based catalyst synthesis process. It has been discovered that catalyst particle morphology and tap density advantageously may be controlled based on the amount defoamer contained in the precursor composition. Generally, the greater the amount of defoamer that is contained in the precursor composition, the more spherical the resulting catalyst particles will be. Spherical particles tend to pack better into layers, and hence generally possess greater tap densities than non-spherical particles. As a general rule, the greater the amount of defoamer that is contained in the precursor composition, the greater the resulting tap density.

Conversely, the less defoamer that is contained in the precursor composition, the less spherical the resulting catalyst particles will be, and the lower the resulting tap density. This relationship between defoamer content and catalyst particle morphology may be utilized to carefully synthesize catalyst particles that are well-suited for a desired application, such as, for example, for hydrogen-air fuel cell or direct methanol fuel cell applications.

In one embodiment, for example, the invention relates to a process for forming catalyst particles having a tap density less than $0.80$ $g/m^3$, e.g., less than $0.70$ $g/m^3$, less than $0.65$ $g/m^3$, less than $0.60$ $g/m^3$, less than $0.50$ $g/m^3$, or less than $0.40$ $g/m^3$. The process comprises the steps of: (a) providing a precursor composition comprising support particles, an active phase precursor, a vehicle and less than about 2 weight percent defoamer, based on the total weight of the precursor composition; (b) aerosolizing the precursor composition to form a flowing stream of droplets; and (c) heating the flowing stream of droplets under conditions effective to vaporize the vehicle and form the catalyst particles, wherein the catalyst particles comprise an active phase disposed on the support particles. In this aspect, the catalyst particles preferably have a substantially non-spherical morphology.

In another embodiment, the invention is to a process for forming catalyst particles having a tap density greater than 0.65 g/m$^3$, e.g., greater than 0.75 g/m$^3$, or greater than 0.85 g/m$^3$. The process comprises the steps of: (a) providing a precursor composition comprising support particles, an active phase precursor, a vehicle and at least about 2 weight percent defoamer, e.g., at least about 4, at least about 6, at least about 8 or at least about 10 weight percent defoamer, based on the total weight of the precursor composition; (b) aerosolizing the precursor composition to form a flowing stream of droplets; and (c) heating the flowing stream of droplets under conditions effective to vaporize the vehicle and form the catalyst particles, wherein the catalyst particles comprise an active phase disposed on the support particles. In this embodiment, the catalyst particles preferably are substantially spherical in morphology.

In another embodiment, the invention is directed to a process for forming catalyst particles having a target morphology, the process comprising the steps of: (a) providing a correlation between defoamer concentration and catalyst particle morphology; (b) determining an amount of defoamer to include in a precursor composition to obtain the target morphology based on the correlation; (c) preparing a precursor composition comprising support particles, an active phase precursor, a vehicle and a defoamer, wherein the amount of defoamer included in the precursor composition is determined in the determining step; (d) aerosolizing the precursor composition to form a flowing stream of droplets; and (e) heating the flowing stream of droplets under conditions effective to vaporize the vehicle and form the catalyst particles, wherein the catalyst particles comprise an active phase disposed on the support particles and have the target morphology.

For purposes of the present specification, tap density is determined with a tapped density tester, such as a VanKel® Tap Density Tester (Varian, Inc.), set at 3000 taps. Tapped density testers generate a tapping action by a rotating eccentric camshaft which lifts a platform containing the sample, typically in a graduated cylinder, and allows it to drop back to its original position. A preferred procedure is to measure out 5-8 mL of powder into a 10 mL tall-form graduated cylinder, and obtain the mass of the powder. The powder is then tapped in the tapped density tester. After tapping is completed, the volume of the tapped powder is determined. The tap density is the mass of the powder divided by the volume of the tapped powder.

The Process

The processes of the present invention preferably form supported catalyst particles in a spray conversion process, preferably a spray pyrolysis conversion process. Spray pyrolysis, for purposes of the present invention, involves initially preparing a precursor composition comprising support particles, an active phase precursor, a vehicle and optionally a defoamer; aerosolizing the composition (using, e.g., an ultrasonic aerosol generator) to form droplets of the composition that are dispersed in and suspended by a carrier gas (e.g., oxygen, nitrogen, or air), thereby forming a flowing stream of droplets; and then removing the vehicle from the droplets to permit the formation of the desired catalyst particles comprising an active phase disposed on the support particles. In some embodiments, the precursor composition is high shear mixed prior to the aerosolizing in order to disperse the support particles contained in the precursor composition. The resulting catalyst particles are then collected in a particle collector. Typically, the precursor composition is spray converted (e.g., at a temperature of from about 300° C. to about 1000° C., e.g., from about 400° C. to about 800° C. or from about 450° C. to about 550° C.) in a spray conversion reactor to remove the liquid from the droplets and to make the catalyst particles. The catalyst particles optionally may be subjected to, during or after the spray conversion process, compositional or structural modification, if desired. Compositional modification may include, for example, partial removal of metal or metal oxides by acid treatment. Structural modification may include, for example, alloying or crystallization of the metallic phase that is formed from the active phase precursor.

Support Particles

The precursor composition preferably comprises support particles that comprise carbon, and preferably carbon black particles. Exemplary carbon black particles include VULCAN® XC68, VULCAN® XC72, VULCAN® XC605 MONARCH® 700, MONARCH® 1100, Ketjen Black® EC600, Black Pearls® 700, Black Pearls® 800, Regal® 350, Regal® 250, and Black Pearls® 570, all manufactured by Cabot Corp., Boston, Mass., USA. Optionally the carbon black comprises carbon black that has been graphitized, e.g., in a furnace, and/or steam etched to increase its porosity.

The support particles are not limited to carbon-containing support particles. In one aspect, the support particles comprise metal oxide particles. In other non-limiting embodiments, for example, the support particles comprise alumina, titania, silica, ruthenium oxide, tantalum oxide, molybdenum oxide, or a mixture thereof. Optionally, the support particles comprise composite particles comprising two or more components, e.g., carbon and any of the above-identified metal oxides.

The average primary particle size of the support particles, as determined by light scattering particle size measurements, optionally is less than about 100 µm, e.g., less than about 50 µm, less than about 20 µm, less than about 10 µm, or less than about 1 µm. In terms of ranges, the average primary particle size of the support particles optionally is from about 1 nm to about 100 µm, e.g., from about 2 µm to about 50 µm, or from about 10 µm to about 50 µm.

During the spray conversion processes of the present invention, the support particles preferably are aggregated to form the catalyst particles. Thus, the catalyst particles preferably comprise aggregates of the support particles and hence are generally larger in size than the individual primary support particles. The catalyst particles (e.g., aggregate of support particles) optionally have an average particle size greater than about 1 µm, e.g., greater than about 10 µm, greater than about 50 µm, or greater than about 100 µm. In terms of ranges, the support particles optionally have an average particle size of from about 1 µm to about 500 µm, e.g., from about 1 µm to about 100 µm, or from about 10 µm to about 100 µm. In this context, the average catalyst particle size is preferably determined by light scattering particle size measurements.

Active Phase Precursor

In some embodiments, the active phase precursor will be a material, such as a salt, dissolved in the vehicle. Non-limiting examples of suitable active phase precursors include metal oxides, metal hydroxides (including hydrated oxides), metal salts of inorganic and organic acids such as, e.g., nitrates, nitrites, sulfates, halides (e.g., fluorides, chlorides, bromides and iodides), carbonates, phosphates, azides, borates (including fluoroborates, pyrazolylborates, etc.), sulfonates, carboxylates (such as, e.g., formates, acetates, propionates, oxalates and citrates), substituted carboxylates (including halogenocarboxylates such as, e.g., trifluoroacetates, hydroxycarboxylates, aminocarboxylates, etc.) and salts and acids wherein the metal is part of an anion (such as, e.g., hexachloroplatinates, tetrachloroaurate, tungstates and the corresponding acids). In some embodiments, the metal comprises a main group metal such as, e.g., lead, tin, antimony and indium, and/or a transition metal such as, e.g., gold, silver, copper, nickel, cobalt, palladium, platinum, iridium, osmium, rhodium, ruthenium, rhenium, vanadium, chromium, manganese, niobium, molybdenum, tungsten, tantalum, iron, cadmium, zinc, titanium, and zirconium. In preferred embodiments, the metal comprises a metal selected from the group consisting of nickel, cobalt, iron, copper, manganese, chromium, ruthenium, rhenium, molybdenum, tungsten, vanadium, zinc, titanium, zirconium, tantalum, iridium, palladium, and gold. Platinum and ruthenium are particularly preferred metals for the purposes of the present invention.

Further non-limiting examples of suitable metal compounds for the process of the present invention include alkoxides, complex compounds (e.g., complex salts) of metals such as, e.g., beta-diketonates (e.g., acetylacetonates), complexes with amines, N-heterocyclic compounds (e.g., pyrrole, aziridine, indole, piperidine, morpholine, pyridine, imidazole, piperazine, triazoles, and substituted derivatives thereof), aminoalcohols (e.g., ethanolamine, etc.), amino acids (e.g., glycine, etc.), amides (e.g., formamides, acetamides, etc.), and nitriles (e.g., acetonitrile, etc.). Non-limiting examples of preferred metal compounds include nitrates, formates, acetates, trifluoroacetates, propionates, oxalates and citrates, particularly nitrates and acetates.

Examples of preferred active phase precursors for use in the present invention include tetraamine platinum hydroxide and platinum nitrate.

The use of mixtures of different compounds, e.g., different salts, of the same metal and/or the use of mixtures of compounds of different metals and/or of mixed metal compounds (e.g., mixed salts and/or mixed oxides) are also contemplated by the present invention. Additional active phase precursors (identified therein as metal precursors) are listed in co-pending U.S. Published Patent Application US 2007/0160899 A1, the entirety of which is incorporated herein by reference.

Vehicle

As indicated above, the precursor composition comprises a liquid vehicle, which imparts flowability to the medium. The liquid vehicle may be any liquid that is convenient and compatible for processing precursor(s) and reagent(s) that are to be included in the precursor composition to make the catalyst particles. The liquid vehicle may comprise a single liquid component, or may be a mixture of two or more liquid components, which may or may not be mutually soluble in the proportions of the mixture.

The liquid vehicle may be an aqueous liquid, an organic liquid or a combination of aqueous and organic liquids. Aqueous liquids are generally preferred for use as the liquid vehicle in most situations because of their low cost, relative safety and ease of use. For example, water has the advantage of being non-flammable, and when vaporized during the formation of the particles does not tend to contribute to formation of byproducts that are likely to complicate processing or contaminate particles. Moreover, aqueous liquids are good solvents for a large number of active phase precursors, although attaining a desired level of solubility for some materials may involve modification of the aqueous liquid, such as pH adjustment.

In some situations, however, organic liquids are preferred for the liquid vehicle. This might be the case, for example, when it is desired to dissolve an active phase precursor into the liquid vehicle in situations when the precursor is not adequately soluble in aqueous liquids, or when aqueous liquids are otherwise detrimental to the precursor. For example, an organic liquid vehicle might be necessary to solubilize a number of organic or organometallic precursor materials.

Defoamer and Other Additives

The precursor composition, according to some embodiments, comprises a defoamer, which is defined herein as any substance that reduces surface tension of the precursor composition relative to the precursor composition in the absence of the defoamer. Without being bound by theory, it is believed that the defoamer forms a coating around the particles, e.g., support particles, contained in the precursor composition, and beneficially controls droplet formation during the step of aerosolizing the precursor composition to form a flowing stream of droplets. It has surprisingly and unexpectedly been discovered that the amount and type of defoamer employed in the processes of the present invention significantly influences the morphology of the resulting catalyst particles. As discussed in more detail below, it has been discovered that, generally, the greater the defoamer content in the precursor composition, the more spherical will be the resulting catalyst particles. Conversely, the lower the defoamer content in the precursor composition, the more irregular (less spherical) will be the resulting catalyst particles.

Exemplary defoamers for optional use in the processes of the present invention include, but are not limited to, Surfynol™ DF 110D (Air Products, Allentown, Pa.), which is 2,5,8,11-tertamethyl-6-dodecyne-5,8-diol, a polyglycol, and a polyol. In a preferred embodiment, the defoamer comprises a polyol. When the defoamer comprises a polyol, it optionally may be a single polyol or a mixture of two or more polyols (e.g., three, four or five polyols). Exemplary polyols that may be used as a defoamer include 1,3-propanediol, 1,2-butanediol, 2,3-butanediol, 1,3-butanediol, 1,4-butanediol, glycerol, trimethylolpropane, pentaerythritol, triethanolamine and trihydroxymethyl aminomethane.

In some embodiments, the amount of defoamer present in the composition is less than about 2 weight percent defoamer, e.g., less than about 1.2 weight percent, less than about 1.0 weight percent defoamer, less than about 0.8 weight percent, less than about 0.7 weight percent, less than about 0.5 weight percent and less than about 0.1 weight percent defoamer. In some embodiments, the precursor composition is substantially free of defoamer. Depending on the particular defoamer employed, defoamer concentrations that are less than about 2 weight percent may be preferred for the formation of catalyst particles having a non-spherical morphology and having a tap density less than 0.80 g/m$^3$, e.g., less than 0.70 g/m$^3$, less than 0.65 g/m$^3$, less than 0.60 g/m$^3$, less than 0.50 g/m$^3$, or less than 0.40 g/m$^3$.

In terms of ranges, the precursor composition optionally comprises the defoamer in an amount greater than about 0.01 weight percent and less than about 2 weight percent, e.g., greater than about 0.01 weight percent and less than about 1 weight percent, greater than about 0.1 weight percent and less than about 1 weight percent, greater than about 0.5 weight percent and less than about 0.8 weight percent, and greater than about 0.8 weight percent and less than about 1 weight percent defoamer.

In other embodiments, the precursor composition comprises the defoamer in an amount greater than about 0.001 weight percent, e.g., greater than about 0.01, greater than about 0.1, greater than about 0.5, greater than about 1, greater than about 1.5, greater than about 2, greater than about 3, greater than about 4, greater than about 6, greater than about 8 or greater than about 10 weight percent. Depending on the particular defoamer employed, defoamer concentrations that are greater than about 2 weight percent may be preferred for the formation of catalyst particles having a highly spherical morphology and having a tap density greater than 0.65 g/m$^3$, e.g., greater than 0.75 g/m$^3$, or greater than 0.85 g/m$^3$.

In optional embodiments, the precursor composition further comprises a dispersant, in addition to support particles, an active phase precursor, a vehicle and a defoamer. If dispersant is included in the precursor composition, it preferably is present in an amount sufficient to maintain the support particles contained in the precursor composition suspended. Generally, the minimal amount of dispersant is present in the precursor composition while affording a stable dispersion.

In some exemplary embodiments, the precursor composition comprises a dispersant in an amount less than 40 vol. %, e.g., less than 30 vol. %, less than 20 vol. %, less than 10 vol. % or less than 5 vol. %. The dispersant optionally comprises one or more cellulose ethers, e.g., water-soluble methylcellulose polymers or hydroxypropyl methylcellulose polymers. The dispersant optionally comprises methycellulose, and optionally has a methoxyl content ranging from 19-32%, and an optional hydroxypropyl content ranging from about 7 to about 12%. In another embodiment, the dispersant comprises Hypromellose (hydroxypropyl methylcellulose (HPMC)). In some exemplary embodiments, the dispersant is selected from the group consisting of Methocel E3, Methocel E5, Methocel E15, Methocel A15, Methocel K35, and mixtures thereof (The Dow Chemical Company).

Catalyst Particles

As discussed previously, the catalyst particles formed by the processes of the present invention preferably comprise an active phase disposed on the support particles, which are typically aggregated in the catalyst particles. By "disposed" it is meant that the active phase can form as particles or crystallites on the surface of the support particles. If the support particles are porous, the active phase can also form as particles within the pores of the support particles.

As indicated above, it has been discovered that tap density of the product catalyst particles beneficially may be controlled by controlling the amount of defoamer contained in the precursor composition. Generally, the lower the defoamer content in the precursor composition, the lower the tap density of the resulting catalyst particles. Thus, in one embodiment, by employing a relatively low concentration of defoamer in the precursor composition, the process provides the ability to form highly irregular (non-spherical) catalyst particles in an aerosol (e.g., spray pyrolysis) reaction process. In such embodiments, for example, the catalyst particles made according to the process of the present invention optionally have a tap density less than 0.80 g/m³, e.g., less than 0.70 g/m³, less than 0.65 g/m³, less than 0.60 g/m³, less than 0.50 g/m³, less than 0.45 g/m³, less than 0.40 g/m³, or less than 0.30 g/m³. In these aspects, the catalyst particles made according to the process of the present invention optionally have a tap density of from about 0.10 g/m³ to about 0.60 g/m³, e.g., from about 0.20 g/m³ to about 0.40 g/m³, or from about 0.30 g/m³ to about 0.60 g/m³.

Conversely, the greater the defoamer content in the precursor composition, the greater the tap density of the resulting catalyst particles. In these aspects, the catalyst particles made according to the process of the present invention optionally have a tap density greater than 0.65 g/m³, e.g., greater than 0.70 g/m³, greater than 0.75 g/m³, greater than 0.80 g/m³, greater than 0.85 g/m³, or greater than 0.9 g/m³. The catalyst particles made according to the processes of the present invention have, in some embodiments, a tap density from about 0.70 g/m³ to about 1.0 g/m³, e.g., from about 0.70 g/m³ to about 0.90 g/m³, or from about 0.70 g/m³ to about 0.80 g/m³.

The catalyst particles made according to the process of the present invention have, in some embodiments, a Brunauer, Emmett, and Teller (BET) nitrogen adsorption surface area of greater than 200 m²/g, e.g., greater than 400 m²/g, greater than 500 m²/g, greater than 600 m²/g, or greater than 800 m²/g. Optionally, the catalyst particles have a BET nitrogen surface area of from about 100 to about 700 m²/g, e.g., from about 200 to about 500 m²/g.

Active Phase

As discussed above, the catalyst particles comprise an active phase disposed in and/or on the support particles. By "disposed" it is meant that the active phase can form as particles, e.g., nanoclusters of nanoparticles, on the surface of the support particles. If the support particles are porous, the active phase can also form as particles within the pores of the support particles.

In one aspect, whether the active phase forms as particles on the surface of the support particles and/or in the pores of the support particles, when the support particles are porous, the active phase particles can have an average particle size (expressed as number average) of at least about 2 nm, e.g., at least about 10 nm, at least about 20 nm, or at least about 50 nm, but preferably not higher than about 200 nm. The average particle sizes and particle size distributions referred to herein for the active phase particles may be measured by conventional methods such as, e.g., by scanning electron microscopy (SEM) or transmission electron microscopy (TEM).

In some embodiments, the active phase is a metal. In some embodiments, as indicated above, the metal is a pure metal or a mixture of metals. The metal is optionally selected from the group consisting of nickel, cobalt, iron, copper, manganese, chromium, ruthenium, rhenium, molybdenum, tungsten, vanadium, zinc, titanium, zirconium, tantalum, iridium, platinum, palladium, and gold. The surface of the metal-containing compound represents the active site where chemical reactions will occur that are catalyzed by the metal in the metal-containing compound. Thus, for example, the catalyst particles of the present invention will comprise a metal-containing compound that makes them suitable for use as hydrogen/air fuel cell catalysts; as direct methanol fuel cell catalysts; or even as catalysts for the hydrogenation of alkenes and alkynes.

In one embodiment, as indicated above, the invention relates to the unexpected and surprising finding that the morphology of the catalysts of some of the embodiments of the present invention can be controlled by varying the concentration of defoamer present in the precursor composition. Thus, in a second embodiment, the invention relates to a process for forming catalyst particles having a target morphology, the process comprising the steps of: (a) providing a correlation between defoamer concentration and catalyst particle morphology; (b) determining an amount of defoamer to include in a precursor composition to obtain the target morphology based on the correlation; (c) preparing a precursor composition comprising support particles, an active phase precursor, a vehicle and a defoamer, wherein the amount of defoamer included in the precursor composition is determined in the determining step; (d) aerosolizing the precursor composition to form a flowing stream of droplets; and (e) heating the flowing stream of droplets under conditions effective to vaporize the vehicle and form the catalyst particles, wherein the catalyst particles comprise an active phase disposed on the support particles and have the target morphology.

EXAMPLES

The present invention will be better understood in view of the following non-limiting examples.

In Examples 1-9 catalyst particles were formed from precursor compositions containing various types and concentrations of defoamers, as described below and as shown in Table 1. SEM images were obtained and the tap densities and BET pore volumes were determined for each catalyst sample.

The catalyst particles formed in Examples 1-9 were also formed into MEAs and tested in a direct methanol fuel cell (DMFC). The MEAs formed from the catalyst samples of Examples 1, 3-6 and 9 were also conditioned and tested in hydrogen air fuel cells. The results from the DMFC and hydrogen air fuel cell testing are presented in Table 2, below, and in FIG. 20. The procedures employed for forming and testing the MEAs under DMFC and hydrogen air fuel cell conditions are described below after Example 9.

TABLE 1

PARAMETERS AND DATA FOR EXAMPLES 1-9

| Ex. | Defoamer (Wt. %) | % C | % E3[6] | Defoamer Type | Inlet Temp (° C.) | Outlet Temp (° C.) | Tap Density ($g/m^3$) | BET | BET PV[1] | DAR[2] (%) | DMFC, 0.45 V | SEM | Pol. Curve[3] |
|---|---|---|---|---|---|---|---|---|---|---|---|---|---|
| 1 | 0.00 | 85.53 | 14.47 | N/A | 540 | 300 | 0.37 | 443 | 0.82 | 0.1690 | 72 | FIG. 1 | FIG. 2 |
| 2 | 0.79 | 84.84 | 14.37 | A[4] | 540 | 300 | 0.44 | 483 | 0.84 | 0.1690 | 72 | FIG. 3 | FIG. 4 |
| 3 | 1.68 | 84.08 | 14.24 | B[5] | 540 | 300 | 0.55 | 395 | 0.62 | 0.1690 | 77 | FIG. 5 | FIG. 6 |
| 4 | 2.68 | 83.23 | 14.10 | B | 540 | 300 | 0.62 | 369 | 0.54 | 0.1690 | 86 | FIG. 7 | FIG. 8 |
| 5 | 3.54 | 82.49 | 13.97 | B | 540 | 300 | 0.64 | 356 | 0.59 | 0.1690 | 90 | FIG. 9 | FIG. 10 |
| 6 | 4.38 | 81.77 | 13.85 | B | 540 | 300 | 0.68 | 338 | 0.57 | 0.1690 | 99 | FIG. 11 | FIG. 12 |

TABLE 1-continued

PARAMETERS AND DATA FOR EXAMPLES 1-9

| Ex. | Defoamer (Wt. %) | % C | % E3[6] | Defoamer Type | Inlet Temp (° C.) | Outlet Temp (° C.) | Tap Density (g/m³) | BET | BET PV[1] | DAR[2] (%) | DMFC, 0.45 V | SEM | Pol. Curve[3] |
|---|---|---|---|---|---|---|---|---|---|---|---|---|---|
| 7 | 4.00 | 72.00 | 24.00 | B | 540 | 300 | 0.57 | 416 | 0.67 | 0.3333 | 104 | FIG. 13 | FIG. 14 |
| 8 | 2.05 | 83.75 | 14.20 | B | 560 | 275 | 0.67 | 341 | 0.57 | 0.1690 | 106 | FIG. 15 | FIG. 16 |
| 9 | 6.02 | 84.79 | 9.19 | B | 520 | 275 | 0.66 | 363 | 0.61 | 0.1084 | 99 | FIG. 17 | FIG. 18 |

[1]BET pore volume;
[2]X-ray diffraction;
[3]DMFC MEA Polarization Curve;
[4]Surfynol DF110D;
[5]Polyglycol P2000;
[6]Methocel E3 dispersant.

TABLE 2

EFFECT OF DEFOAMER CONCENTRATION ON CATALYST PERFORMANCE

| | Example | | | | | |
|---|---|---|---|---|---|---|
| | 1 | 3 | 4 | 5 | 6 | 9 |
| Defoamer Conc. (Wt. %) | 0 | 1.68 | 2.68 | 3.54 | 4.38 | 6.02 |
| $H_2$ Air Power Density at 0.8 V (mW/cm²) | 460 | 640 | 370 | 400 | 410 | 440 |
| DMFC Power Density at 0.45 V (mW/cm²) | 72 | 77 | 86 | 90 | 99 | 99 |
| Defoamer Name | N/A | P2000 | P2000 | P2000 | P2000 | P2000 |

Example 1

To 85.53 g of Ketjen Black EC600 in a high shear mixer containing some water was added 14.47 g of Methocel™ E3 cellulose (Dow Chemical). The resulting mixture was processed to disperse the carbon using the cellulose-dispersing agent and enough DI water added to make up 4.55% carbon loading in the dispersion. A desired amount of Pt precursor was mixed with the carbon black dispersion under the shearing conditions and the solution at 4% solid loading was pumped into the spray conversion reactor under the controlled conditions described in Table 1, above, for this Example and the other Examples described hereinbelow. As evidenced by the data shown in Table 1, the catalyst produced using the protocol described above had a low tap density, high surface area and high pore volume. Further, the catalyst was irregular in shape and was ideal for use in a hydrogen air fuel cell. A scanning electron micrograph (SEM) of the catalyst is shown in FIG. 1.

Figure 2:
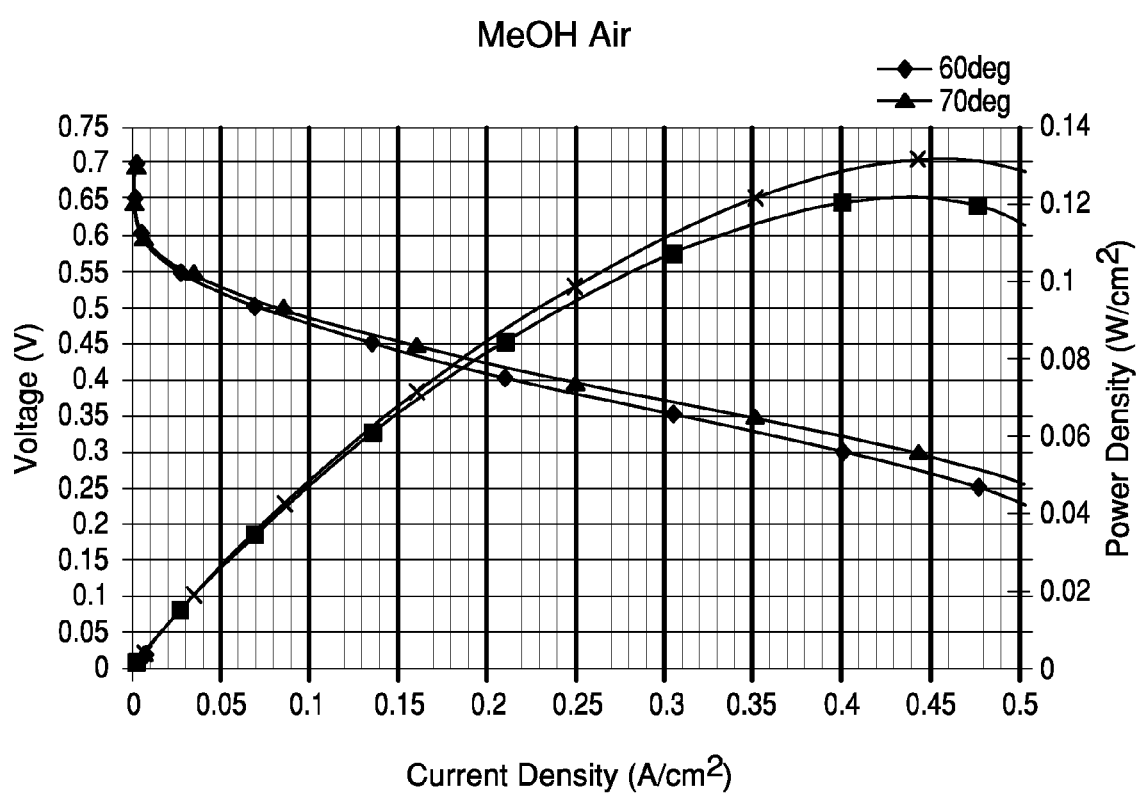
FIG. 2 presents a plot of voltage as a function of current density of a direct methanol fuel cell (DMFC) membrane electrode assembly (MEA) comprising the catalyst particles made according to the process described in Example 1.

The catalyst was tested in a DMFC membrane electrode assembly (MEA). FIG. 2 shows a plot of voltage as a function of current density for a DMFC MEA comprising the catalyst made according to Example 1. The catalyst was also tested in a hydrogen air MEA. The results are shown in Table 2, above, and in FIG. 20.

Example 2

Figure 3:
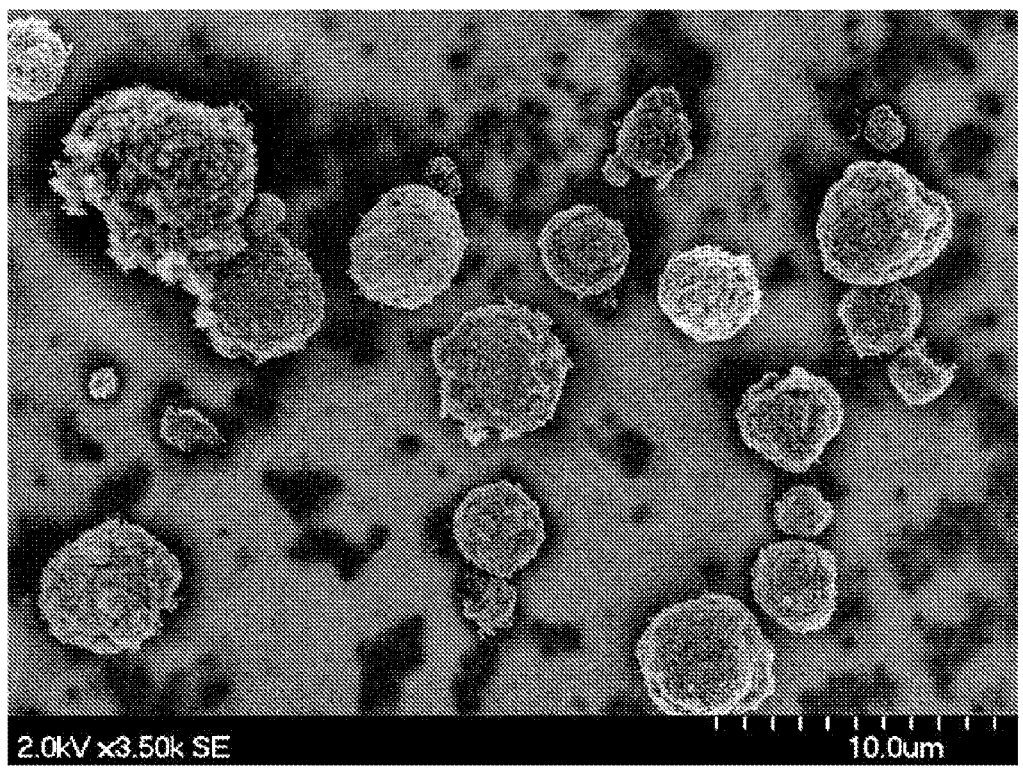
FIG. 3 presents a SEM the catalyst particles made according to the process described in Example 2.

To 84.84 g of Ketjen Black EC600 in a high shear mixer containing some water was added 14.37 g of Methocel™ E3 cellulose (Dow Chemical) and 0.79 g of Surfynol DF 110D defoamer (Air Products). The resulting mixture was processed to disperse the carbon using the cellulose-dispersing agent and enough DI water added to make up 4.55% carbon loading in the dispersion. A desired amount of Pt precursor was mixed with the carbon black dispersion under the shearing conditions and the solution at 4% solid loading was pumped into the spray conversion reactor under the controlled conditions described in Table 1. As evidenced by the data shown in Table 1, the catalyst produced using the protocol described above has a low tap density, high surface area and high pore volume. Further, the catalyst was irregular in shape and was ideal for use in a hydrogen air fuel cell. A SEM of the catalyst is shown in FIG. 3.

Figure 4:
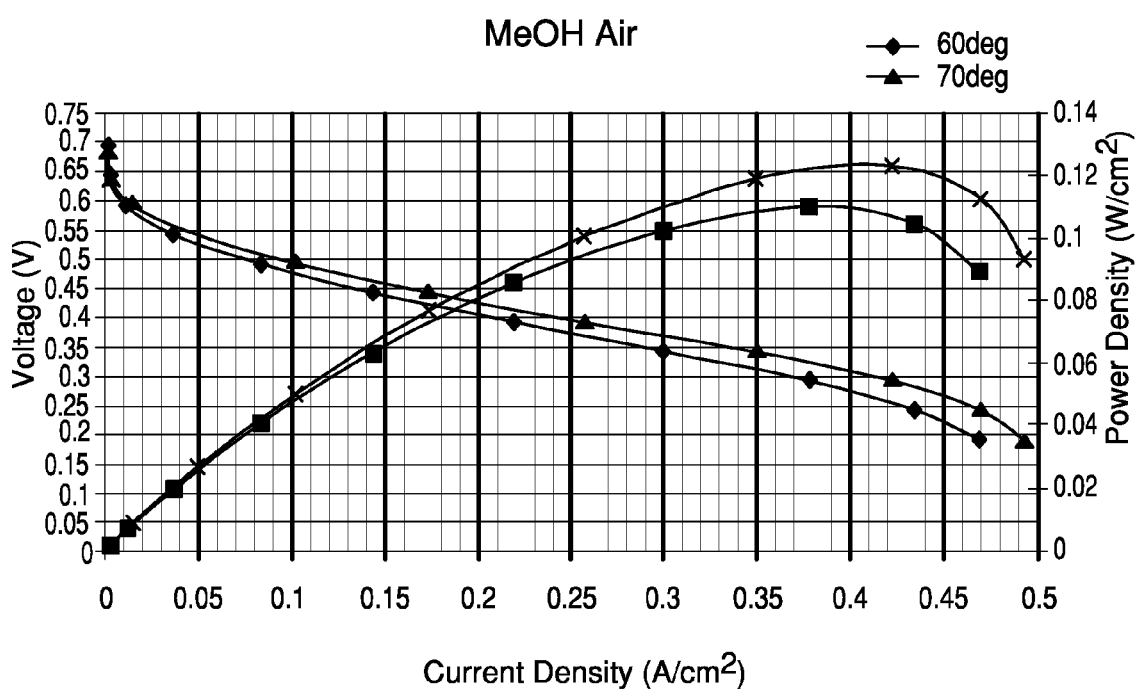
FIG. 4 presents a plot of voltage as a function of current density of a DMFC MEA comprising the catalyst particles made according to the process described in Example 2.

The catalyst was tested in a DMFC membrane electrode assembly (MEA). FIG. 4 shows a plot of voltage as a function of current density for a DMFC MEA comprising the catalyst made according to Example 2.

Example 3

Figure 5:
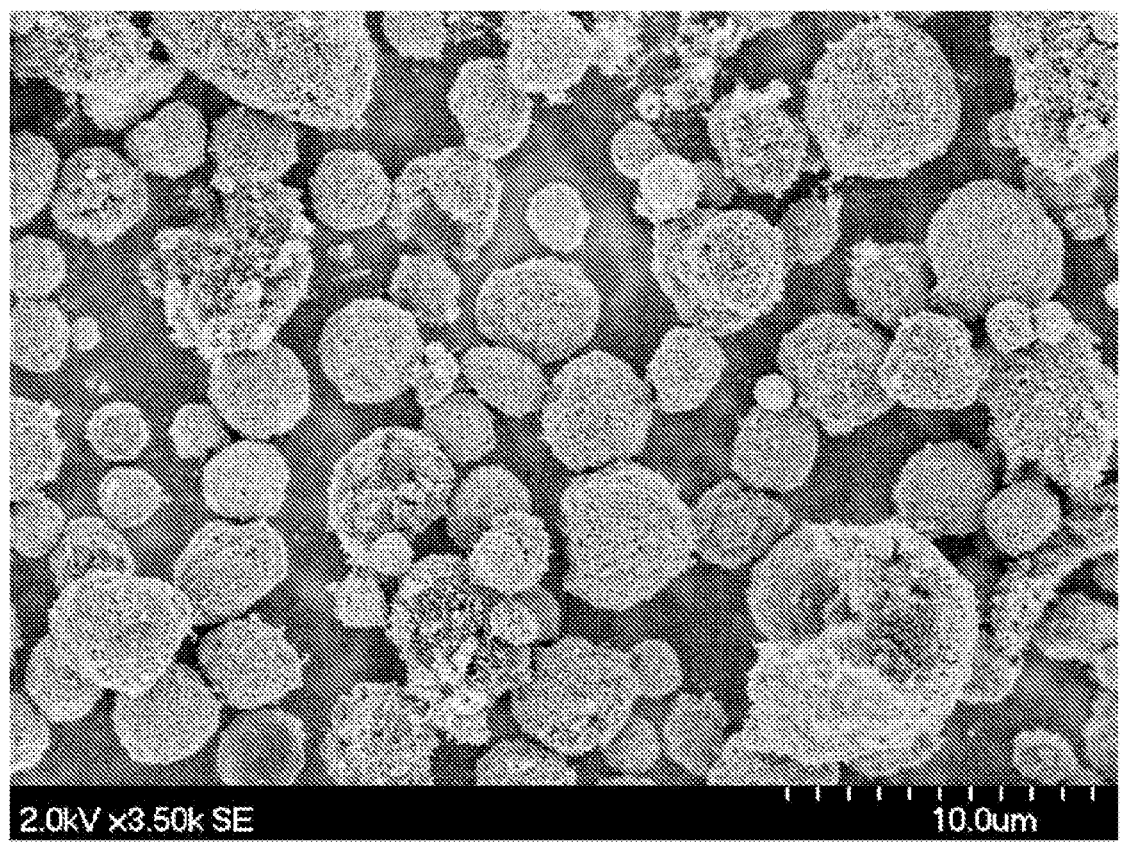
FIG. 5 presents a SEM the catalyst particles made according to the process described in Example 3.

To 84.08 g of Ketjen Black EC600 in a high shear mixer containing some water was added 14.24 g of Methocel™ E3 cellulose (Dow Chemical) and 1.68 g of Polyglycol P2000 defoamer (Dow Chemical). The resulting mixture was processed to disperse the carbon using the cellulose-dispersing agent and enough DI water added to make up 12.28% carbon loading in the dispersion. A desired amount of Pt precursor was mixed with the carbon black dispersion under the shearing conditions and the solution at 4% solid loading was pumped into the spray conversion reactor under the controlled conditions described in Table 1, above. As evidenced by the data shown in Table 1, the catalyst produced using the protocol described above had a medium tap density, medium surface area and medium pore volume. Further, the catalyst contained spheres that have a "bumpy" surface and the catalyst is a blend of spherical and irregular particles. This catalyst is ideal for use in a hydrogen air fuel cell. A SEM of the catalyst is shown in FIG. 5.

Figure 6:
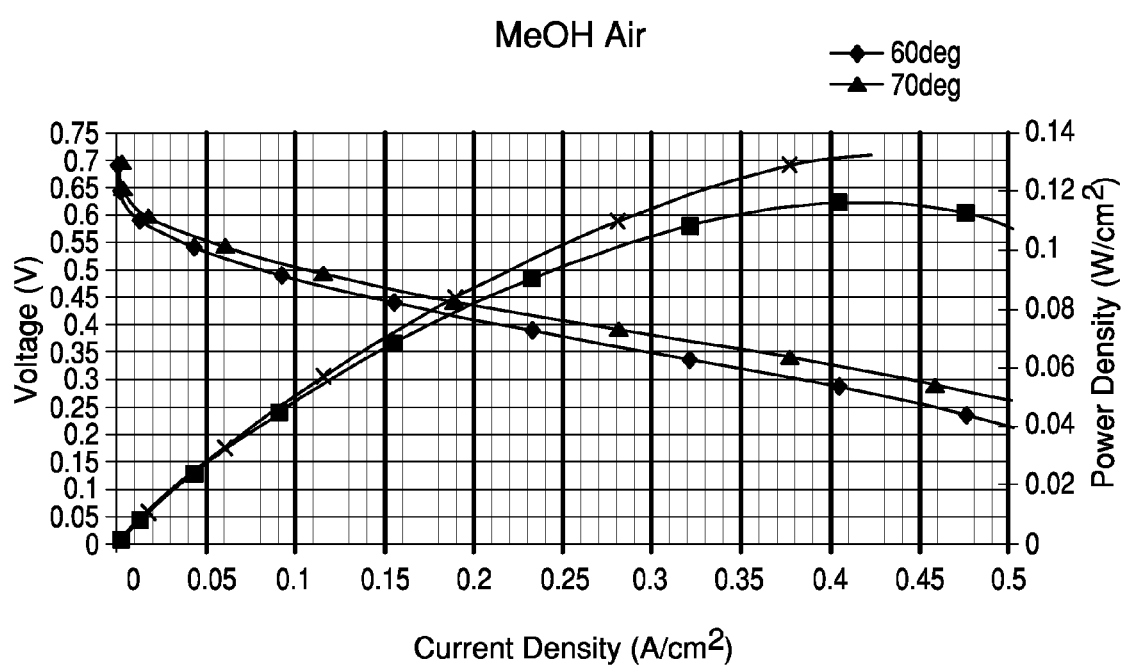
FIG. 6 presents a plot of voltage as a function of current density of a DMFC MEA comprising the catalyst particles made according to the process described in Example 3.

The catalyst was tested in a DMFC MEA. FIG. 6 shows a plot of voltage as a function of current density for a DMFC MEA comprising the catalyst made according to Example 3. The catalyst was also tested in a hydrogen air MEA. The results are shown in Table 2, above, and in FIG. 20.

Example 4

Figure 7:
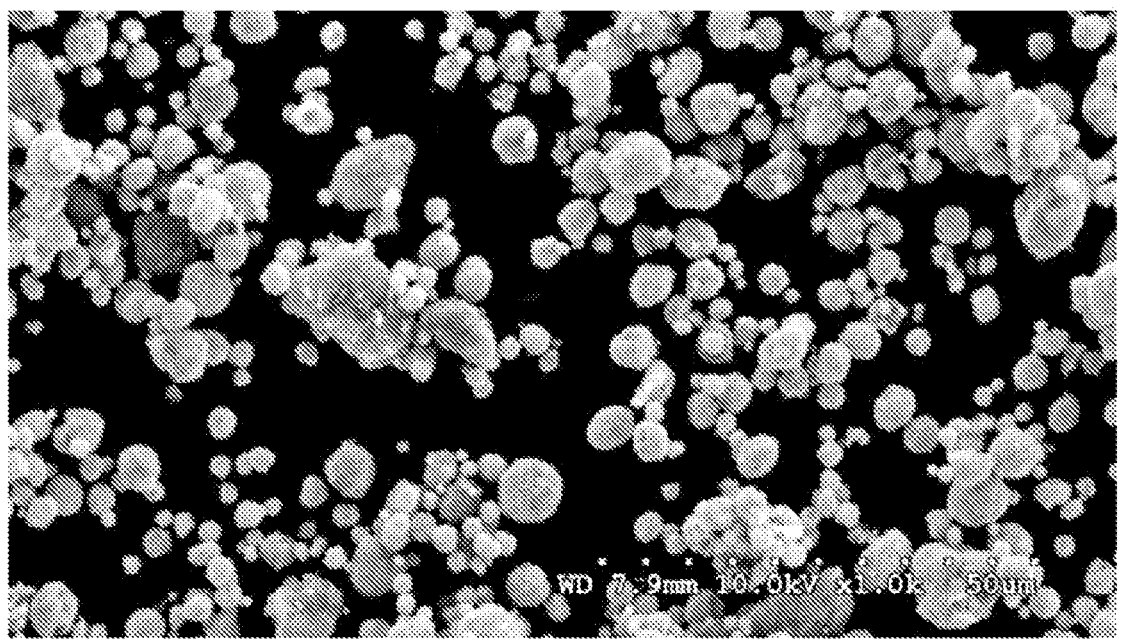
FIG. 7 presents a SEM the catalyst particles made according to the process described in Example 4.

To 83.23 g of Ketjen Black EC600 in a high shear mixer containing some water was added 14.10 g of Methocel™ E3 cellulose (Dow Chemical) and 2.68 g of Polyglycol P2000 defoamer (Dow Chemical). The resulting mixture was processed to disperse the carbon using the cellulose-dispersing agent and enough DI water added to make up 4.55% carbon loading in the dispersion. A desired amount of Pt precursor was mixed with the carbon black dispersion under the shearing conditions and the solution at 4% solid loading was pumped into the spray conversion reactor under the controlled conditions described in Table 1, above. As evidenced by the data shown in Table 1, the catalyst produced using the protocol described above had a high tap density, low surface area and low pore volume. The catalyst particles were bumpy sphere in shape and were ideal for DMFCs. A SEM of the catalyst is shown in FIG. 7.

Figure 8:
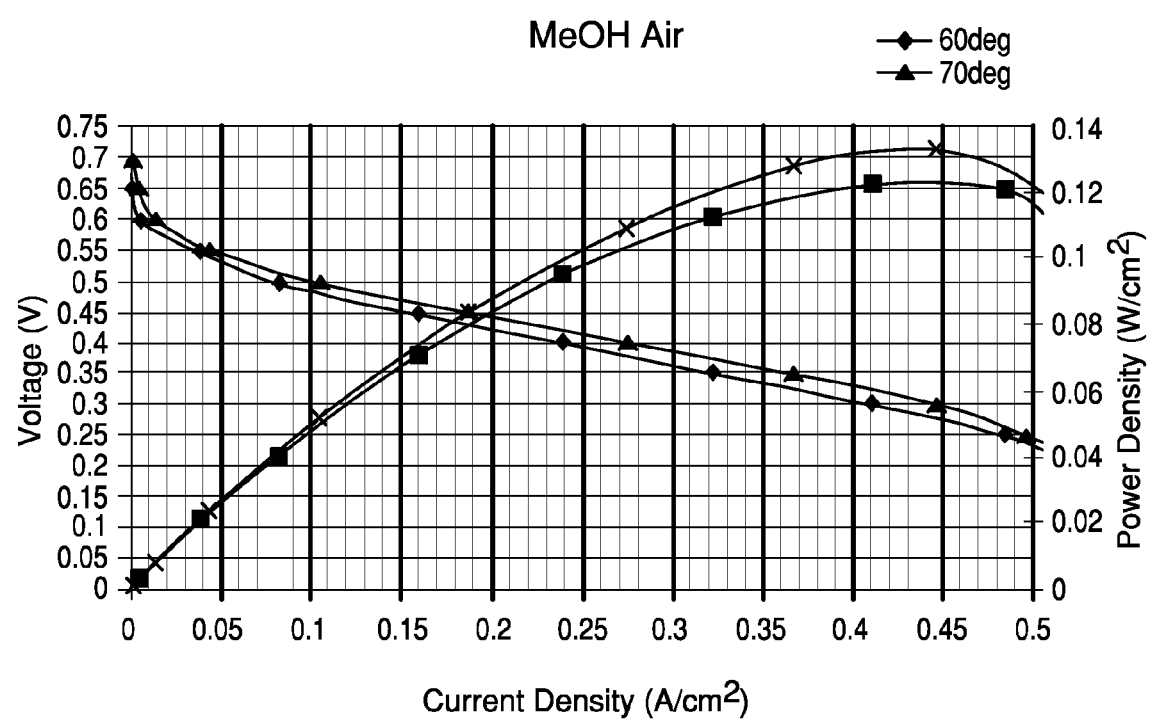
FIG. 8 presents a plot of voltage as a function of current density of a DMFC MEA comprising the catalyst particles made according to the process described in Example 4.

The catalyst was tested in a DMFC MEA. FIG. 8 shows a plot of voltage as a function of current density for a DMFC MEA comprising the catalyst made according to Example 4. The catalyst was also tested in a hydrogen air MEA. The results are shown in Table 2, above, and in FIG. 20.

Example 5

Figure 9:
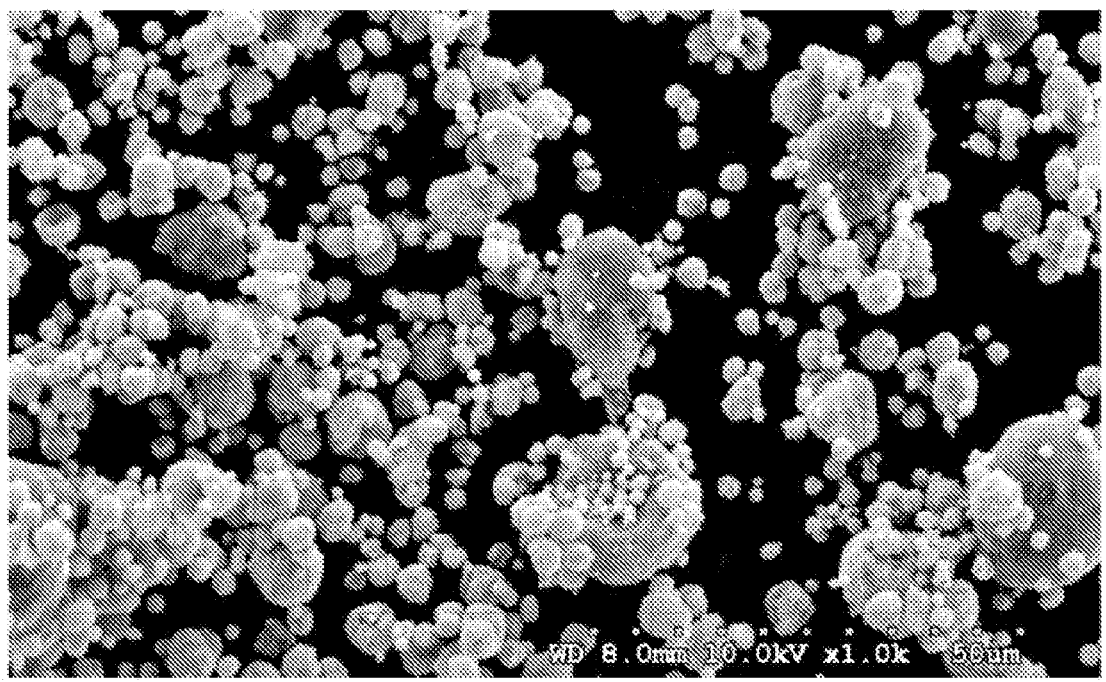
FIG. 9 presents a SEM the catalyst particles made according to the process described in Example 5.

The procedure of Example 4 was repeated except that the defoamer concentration was increased from 2.68% to 3.54% and that increased the tap density from 0.62 to 0.64 units. This made the particles more spherical in shape. The particles also had a low surface area. Such particles are ideal for DMFC applications. As shown on Table 1, the DMFC performance at 0.45 volts was 86 units versus 90 units at 3.54% defoamer concentration. A SEM of the catalyst is shown in FIG. 9.

Figure 10:
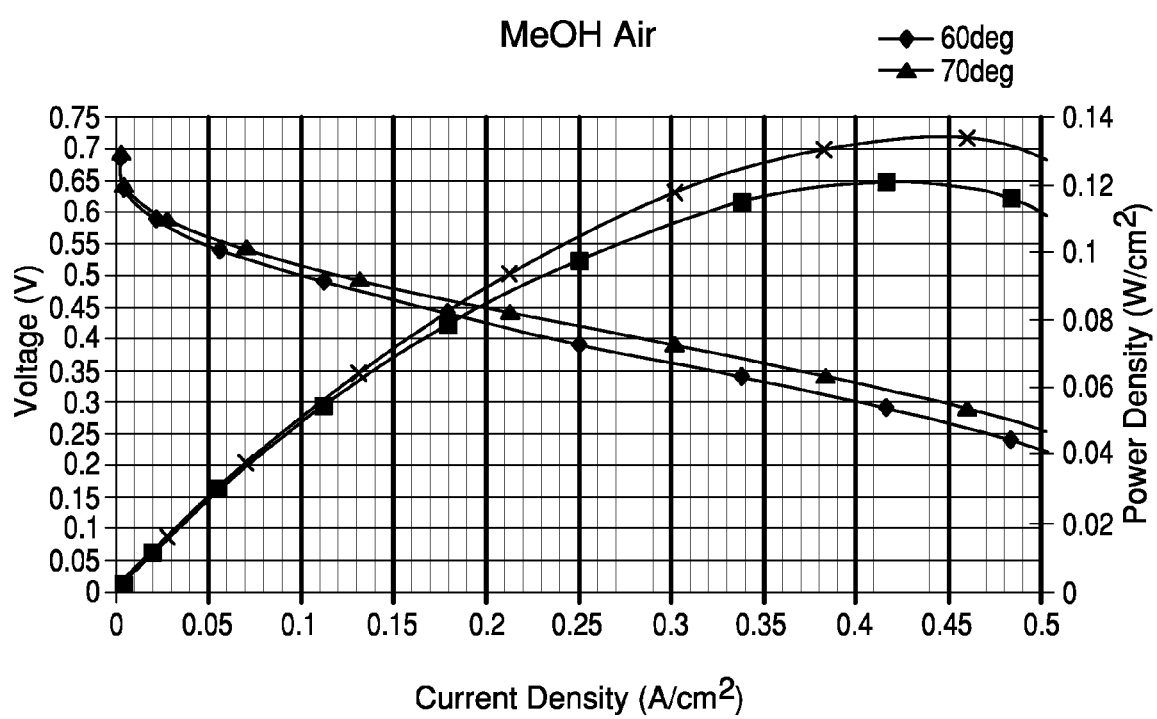
FIG. 10 presents a plot of voltage as a function of current density of a DMFC MEA comprising the catalyst particles made according to the process described in Example 5.

The catalyst was tested in a DMFC MEA. FIG. 10 shows a plot of voltage as a function of current density for a DMFC MEA comprising the catalyst made according to Example 5. The catalyst was also tested in a hydrogen air MEA. The results are shown in Table 2, above, and in FIG. 20.

Example 6

Figure 11:
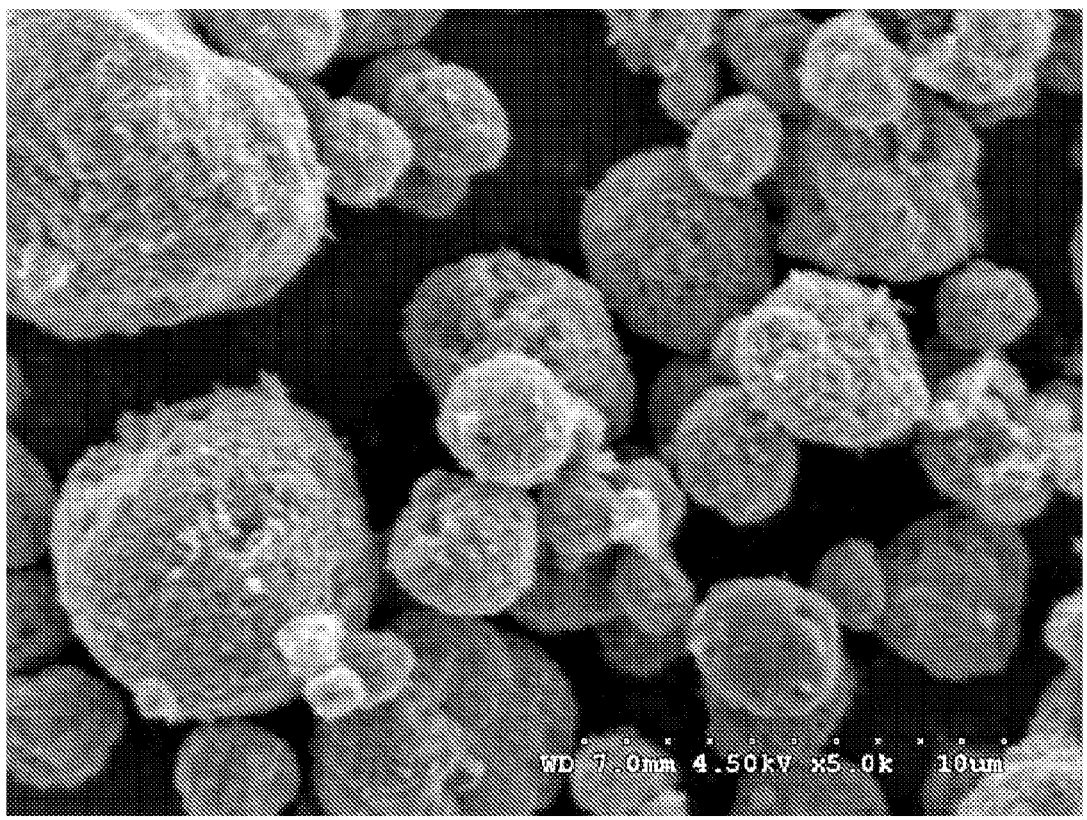
FIG. 11 presents a SEM the catalyst particles made according to the process described in Example 6.

The procedure of Example 4 was repeated except that the defoamer concentration was increased from 2.68% to 4.38% and that increased the tap density from 0.62 to 0.68 units. This made the particles more spherical in shape. The particles also had a low surface area. Such particles are ideal for DMFC applications. As shown on Table 1, the DMFC performance at 0.45 volts was 86 units versus 99 units. A SEM of the catalyst is shown in FIG. 11.

Figure 12:
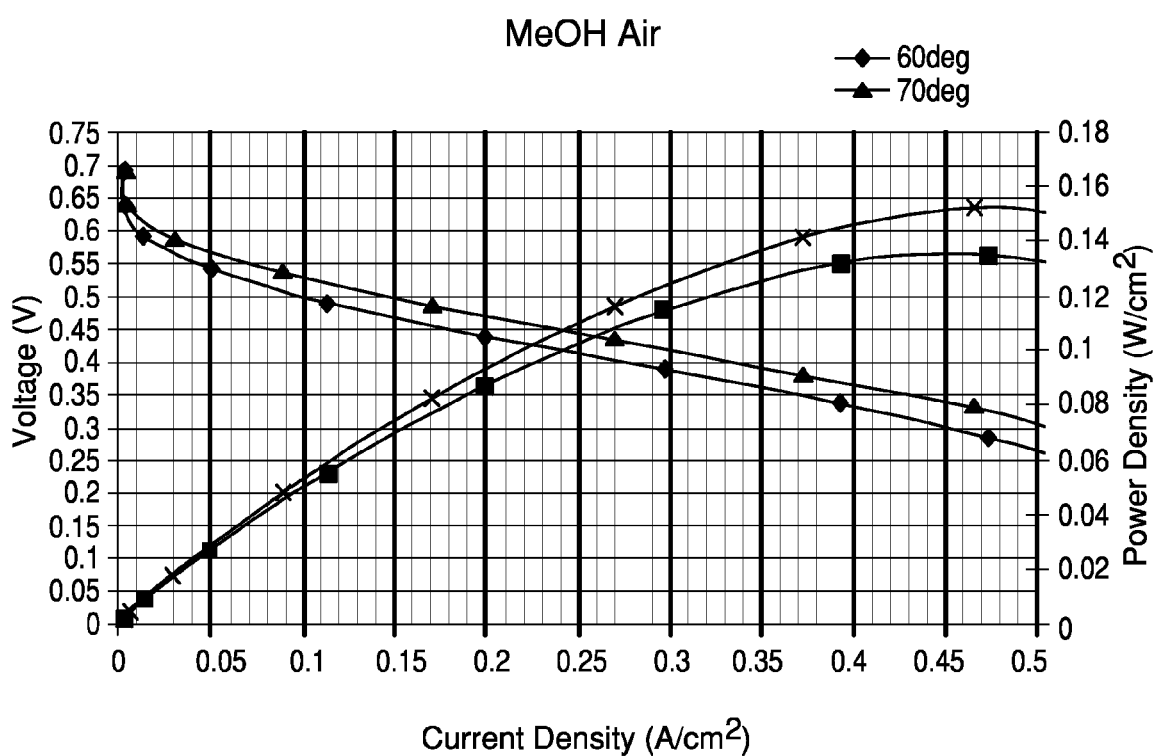
FIG. 12 presents a plot of voltage as a function of current density of a DMFC MEA comprising the catalyst particles made according to the process described in Example 6.

The catalyst was tested in a DMFC MEA. FIG. 12 shows a plot of voltage as a function of current density for a DMFC MEA comprising the catalyst made according to Example 6. The catalyst was also tested in a hydrogen air MEA. The results are shown in Table 2, above, and in FIG. 20.

Example 7

Figure 13:
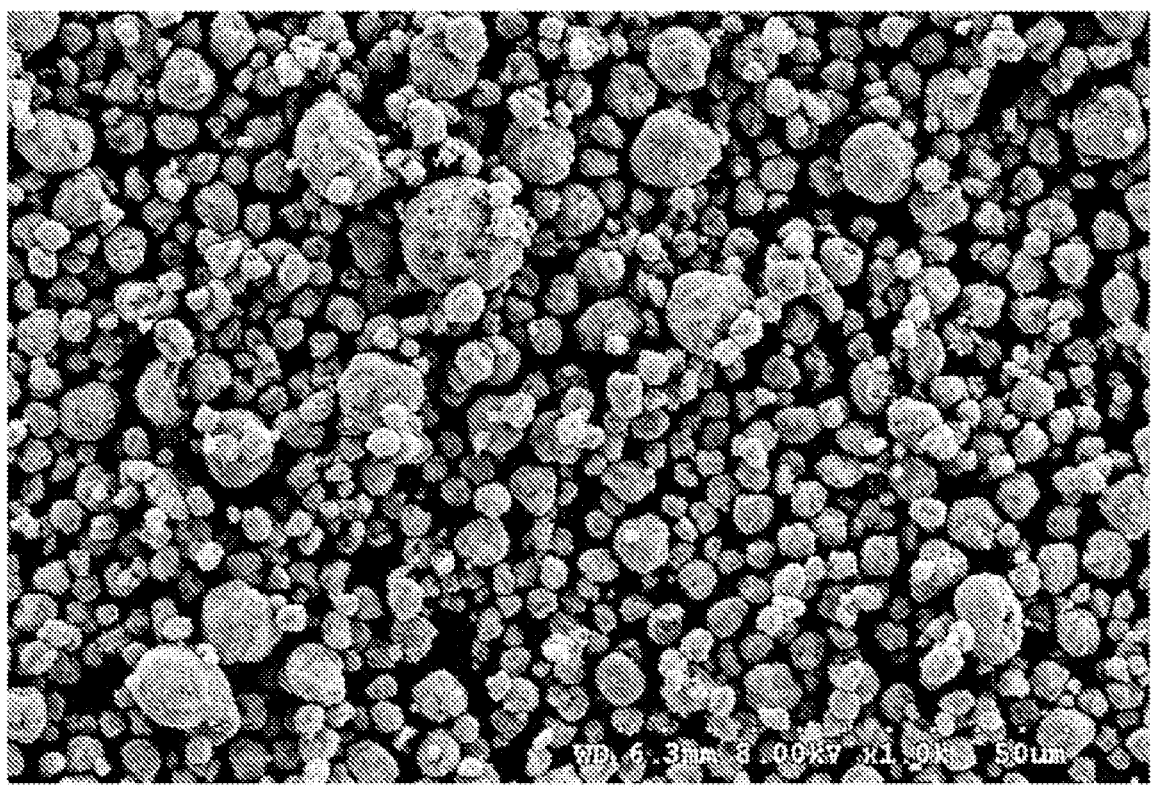
FIG. 13 presents a SEM the catalyst particles made according to the process described in Example 7.

To 72.00 g of Ketjen Black EC600 in a high shear mixer containing some water was added 24.00 g of Methocel™ E3 cellulose (Dow Chemical) and 4.00 g of Polyglycol P1200 defoamer (Dow Chemical). The resulting mixture was processed to disperse the carbon using the cellulose-dispersing agent and enough DI water was added to make up 5.0% carbon loading in the dispersion. A desired amount of Pt precursor was mixed with the carbon black dispersion under the shearing conditions and the solution at 4% solid loading was pumped into the spray conversion reactor under the controlled conditions described in Table 1, above. As evidenced by the data shown in Table 1, the catalyst produced using the protocol described above had a high tap density, low surface area and low pore volume. The catalyst particles were bumpy sphere in shape and are ideal for DMFCs. A SEM of the catalyst is shown in FIG. 13.

Figure 14:
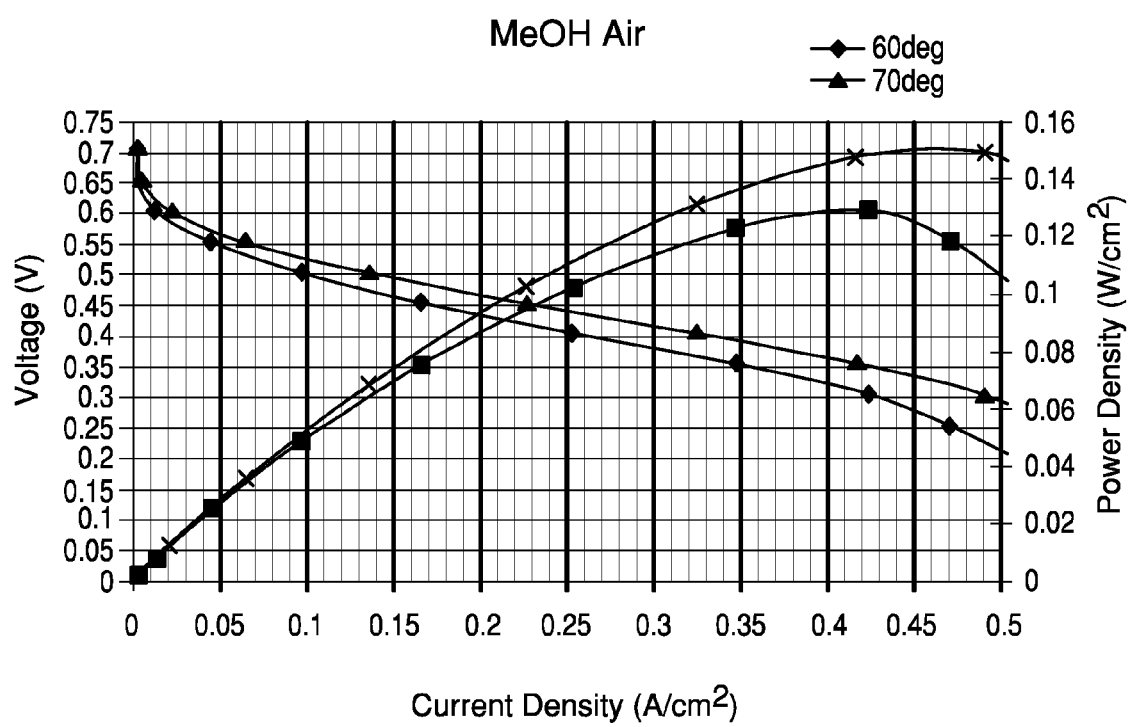
FIG. 14 presents a plot of voltage as a function of current density of a DMFC MEA comprising the catalyst particles made according to the process described in Example 7.

The catalyst was tested in a DMFC MEA. FIG. 14 shows a plot of voltage as a function of current density for a DMFC MEA comprising the catalyst made according to Example 7.

Example 8

Figure 15:
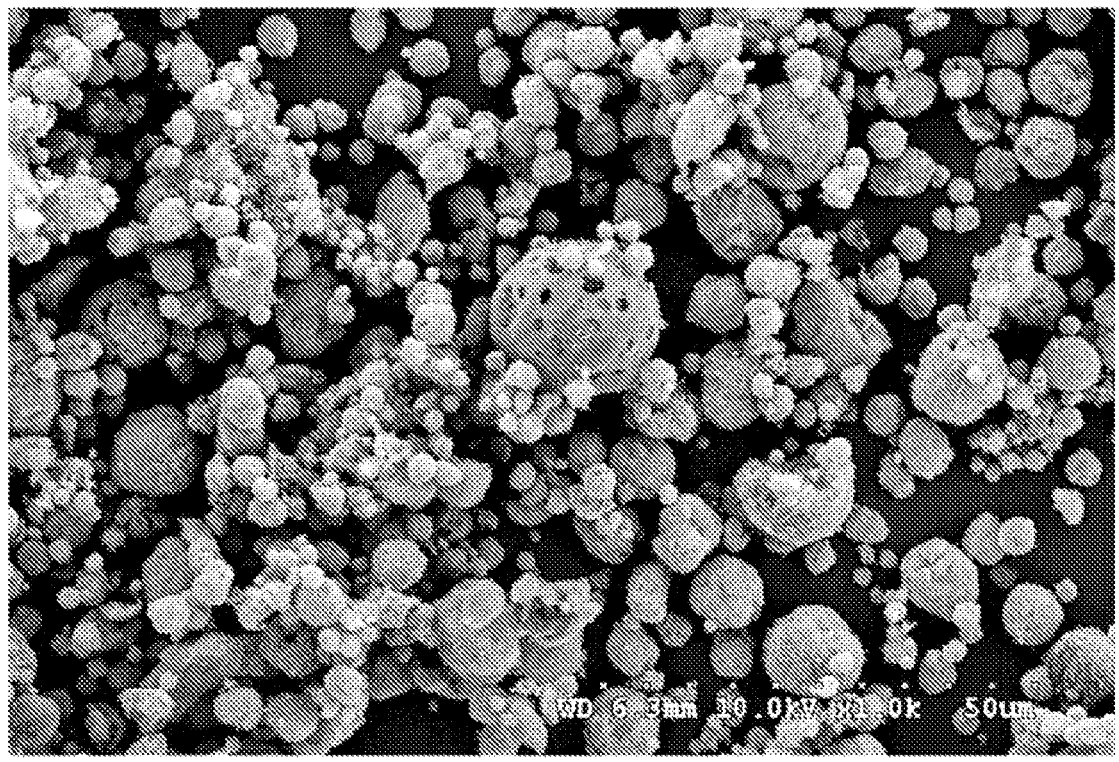
FIG. 15 presents a SEM the catalyst particles made according to the process described in Example 8.
Figure 16:
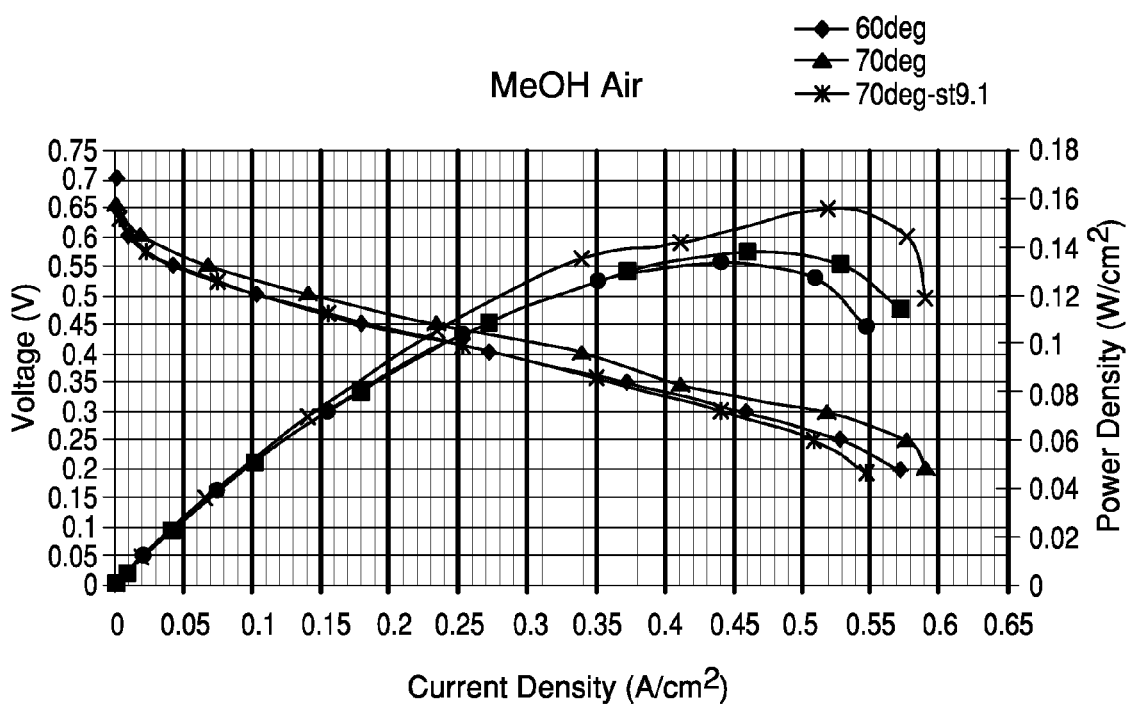
FIG. 16 presents a plot of voltage as a function of current density of a DMFC MEA comprising the catalyst particles made according to the process described in Example 8.

To 83.75 g of Ketjen Black EC600 in a high shear mixer containing some water was added 14.20 g of Methocel™ E3 cellulose (Dow Chemical) and 2.05 g of Polyglycol P1200 defoamer also from Dow Chemicals. The resulting mixture was processed to disperse the carbon using the cellulose-dispersing agent and enough DI water added to make up 5.0% carbon loading in the dispersion. A desired amount of Pt precursor was mixed with the carbon black dispersion under the shearing conditions and the solution at 4% solid loading was pumped into the spray conversion reactor under the controlled conditions described in Table 1. As evidenced by the data shown in Table 1, the catalyst produced using the protocol described above had a high tap density, low surface area and low pore volume. The catalyst particles were bumpy sphere in shape and are ideal for DMFCs. A SEM of the catalyst is shown in FIG. 15. FIG. 16 shows a plot of voltage as a function of current density of a DMFC MEA comprising the catalyst made according to Example 8.

Example 9

Figure 17:
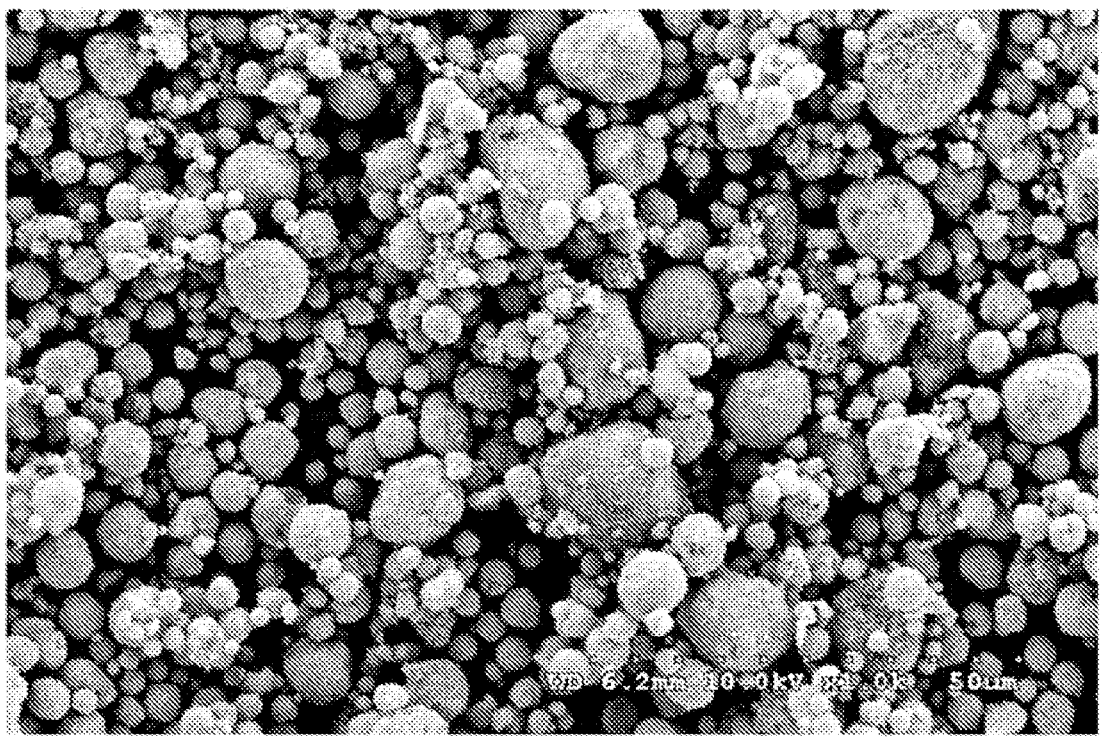
FIG. 17 presents a SEM the catalyst particles made according to the process described in Example 9.

To 84.79 g of Ketjen Black EC600 in a high shear mixer containing some water was added 9.19 g of Methocel™ E3 cellulose (Dow Chemical) and 6.02 g of Polyglycol P2000 defoamer (Dow Chemical). The resulting mixture was processed to disperse the carbon using the cellulose-dispersing agent and enough DI water added to make up 5.0% carbon loading in the dispersion. A desired amount of Pt precursor was mixed with the carbon black dispersion under the shearing conditions and the solution at 4% solid loading was pumped into the spray conversion reactor under the controlled conditions described in Table 1. As evidenced by the data shown in Table 1, the catalyst produced using the protocol described above had a high tap density, low surface area and low pore volume. The catalyst particles were bumpy sphere in shape and are ideal for DMFCs. A SEM of the catalyst is shown in FIG. 17.

Figure 18:
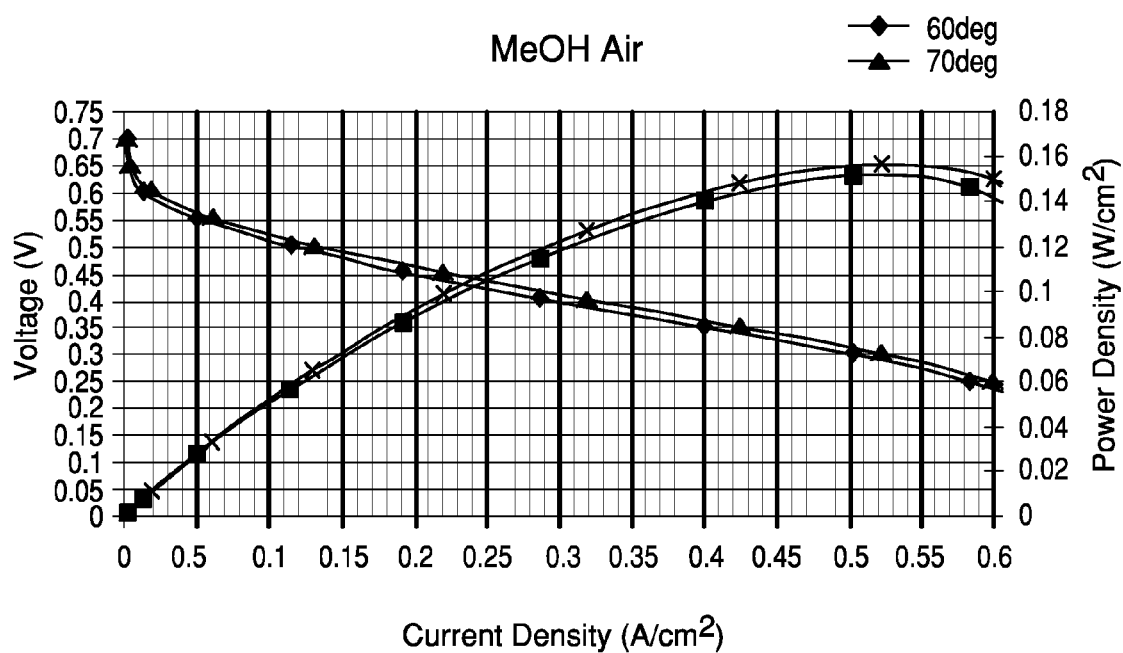
FIG. 18 presents a plot of voltage as a function of current density of a DMFC MEA comprising the catalyst particles made according to the process described in Example 9.

The catalyst was tested in a DMFC MEA. FIG. 18 shows a plot of voltage as a function of current density for a DMFC MEA comprising the catalyst made according to Example 9. The catalyst was also tested in a hydrogen air MEA. The results are shown in Table 2, above, and in FIG. 20.

MEA formation

As indicated above, the catalyst samples from Examples 1-9 were incorporated into MEAs. The following procedure was employed in forming the MEAs.

A 60% PtRu/KB, electrocatalyst that is commercially available from Cabot Corporation as Dynalyst® 60KR2 was used as the anode. 1 gm of this catalyst was weighed into a vessel, and 8 g of de-ionized water was added, followed by sonication using an ultrasonication horn for 10 minutes. After sonication, 5 g of 5 wt. % NAFION® perfluorinated ion exchange resin solution (vehicle: lower aliphatic alcohol/water (20%) solution (EW1100) containing 2-propanol, 1-propanol and methanol) was added to the catalyst mixture and the mixture was sonicated for an additional 5 minutes. The resultant ink was used to print the anode of a catalyst coated membrane (CCM) on one surface of a Nafion 115 layer having an active area 25 cm$^2$ such that the PtRu alloy loading was 3 mg PtRu/cm$^2$ of the anode.

The cathode of the CCM was produced by printing an ink containing a 60% Pt/KB where KB designates Ketjen black, produced by the spray drying methods of Examples 1 to 9, above, onto the opposite surface of the Nafion layer at a Pt loading of 1.5 mg Pt/cm$^2$ of the cathode. The cathode ink was prepared as follows. 6 grams of de-ionized water was added to 1 gm of 60-wt % platinum on carbon. 3.53 grams of 5 wt. % NAFION® perfluorinated ion exchange resin solution (vehicle: lower aliphatic alcohol/water (20%) solution (EW1100) containing 2-propanol, 1-propanol and methanol) was then added to the mixture. The resulting mixture was horn sonicated in an ice bath for 10 minutes (750 W, using 20% of maximum power). For the resultant CCM, identical paper type gas diffusion layers were applied to the anode and cathode to make a membrane electrode assembly (MEA).

MEA Testing Conditions for DMFC

Figure 19:
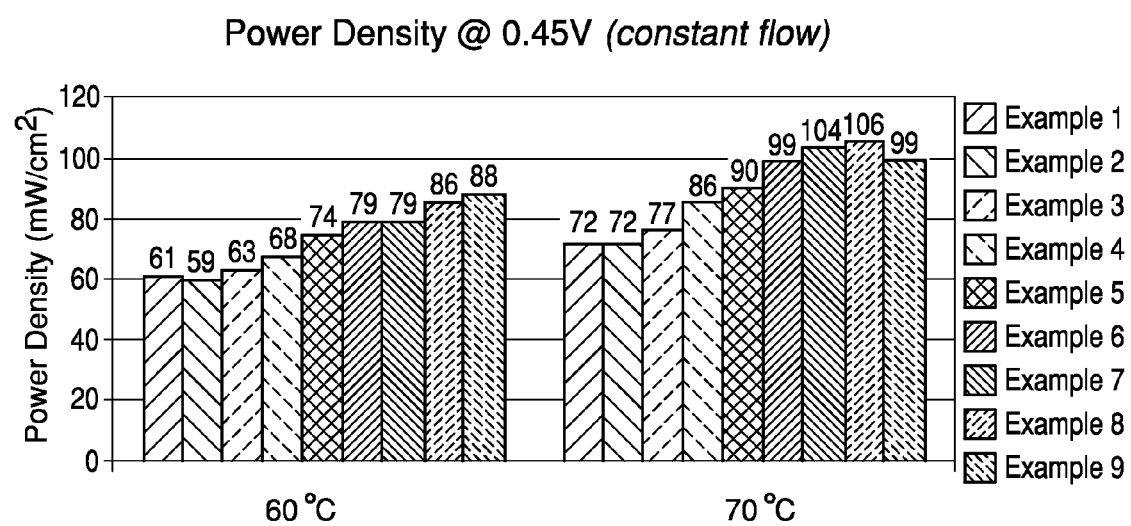
FIG. 19 presents a bar graph showing the power densities at 0.45 volts of the DMFC MEAs of Examples 1-9.

The resultant MEAs were tested in a direct methanol fuel cell, with 1M methanol being supplied to the anode at a rate of 3 ml/min without back pressure, and 400 SCCM of dry air being supplied to the cathode also without back pressure. While fuel cell polarization curves give a good indication of overall power output of a fuel cell, other factors such as the effects of the anode catalyst layer, cathode catalyst layer, and methanol crossover, should also be considered. Therefore, anode polarization curves were obtained for direct analysis of anode catalyst activity in an MEA configuration. During the anode polarization measurement, 1 M methanol was supplied to the anode at a rate of 3 ml/min without back pressure, and 200 SCCM of fully humidified H$_2$ was supplied to the cathode also without back pressure. The anode polarization curves were obtained by applying potential sweeps at the rate of 2 mV/sec between 0.1V and 0.7V. FIG. 19 summarizes the power density at 0.45 volts (constant flow) for each DMFC MEA analyzed.

MEA Testing Conditions for Hydrogen Air Fuel Cells

As indicated above, the MEAs formed from the catalyst samples of Examples 1, 3-6 and 9 were also conditioned and tested in hydrogen air fuel cells according to the following protocols. The data from the hydrogen air MEA's is summarized in Table 2, above.

A 50 cm$^2$ cell was opened and cleaned. A 7 mm Teflon gasket was centered over the flow fields. The MEA was then loaded into the test cell with the cathode facing up. A second 7 mm Teflon gasket was centered on the cathode gas diffusion layer (GDL) and the cell was then assembled. Following a star pattern, the bolts were slowly tightened to 100 inch-pounds (11.3 Newton meters). The cell was then connected to a test station. The MEA was conditioned for approximately 12 hours following the conditioning protocol below. Once the conditioning was complete, the MEA was evaluated under testing protocol to establish baseline hydrogen air performance.

The hydrogen air fuel cell was first conditioned according to the following protocol. Cell temperature was set to 80° C. Anode flow rate was 520 SCCM hydrogen, at 30 psi (207 kPa) backpressure, and 100% relative humidity (anode bubbler dew point was 80° C.). To avoid condensation of water in the gas line, the line was preheated to 85° C. Cathode flow rate was 2060 SCCM air, at 30 psi (207 kPa) backpressure, and 100% RH (cathode bubbler dew point was 80° C.). To avoid condensation of water in the gas line, the line was preheated to 85° C. To condition the MEA the voltage on the cell was cycled between 0.8V where it is held for 200 seconds and 0.5V where it was held for 600 seconds. The voltage cycling was continued for 12 hours.

After conditioning, the hydrogen air fuel cells were tested according to the following protocol. Cell temperature was set to 80° C. Anode flow rate was 520 SCCM hydrogen, at 30 psi (207 kPa) back pressure, and 100% RH (anode bubbler dew point was 80° C.). To avoid condensation of water in the gas line, the line was preheated to 85° C. Cathode flow rate was 2060 SCCM air, at 30 psi (207 kPa) back pressure, and 100% RH (cathode bubbler dew point was 80° C.). To avoid condensation of water in the gas line, the line was preheated to 85° C. Data was collected galvanostatically starting at a total current of 50 amperes (1 ampere/cm$^2$). Cell was held at 50 Amps for 10 minutes with the voltage being measured and averaged over this time period. The average voltage over the 10 minutes was recorded. The average voltage was then collected in the same way at total currents of 40, 30, 25, 20, 15, 10, 5 and 0 amperes.

TABLE 3

TESTING CONDITIONS FOR HYDROGEN AIR FUEL CELL

| | | Anode | | | | Cathode | | | |
|---|---|---|---|---|---|---|---|---|---|
| Tests | Cell Temp (° C.) | Flow Rate/Gas (mL/min) | Bubbler Dew Point (° C.) | Line heaters (° C.) | Back Pressure (psig) (kPa) | Flow Rate/Gas (mL/min) | Bubbler Dew Point (° C.) | Line heaters (° C.) | Back Pressure (psig) (kPa) |
| Conditioning | 80 | 520/H$_2$ | 80 | 85 | 30 207 | 2060/Air | 80 | 85 | 30 207 |
| Testing Protocol | 80 | 520/H$_2$ | 80 | 85 | 30 207 | 2060/Air | 80 | 85 | 30 207 |

Comparing Test Results from DMFC and H$_2$ Air Fuel Cells

Figure 20:
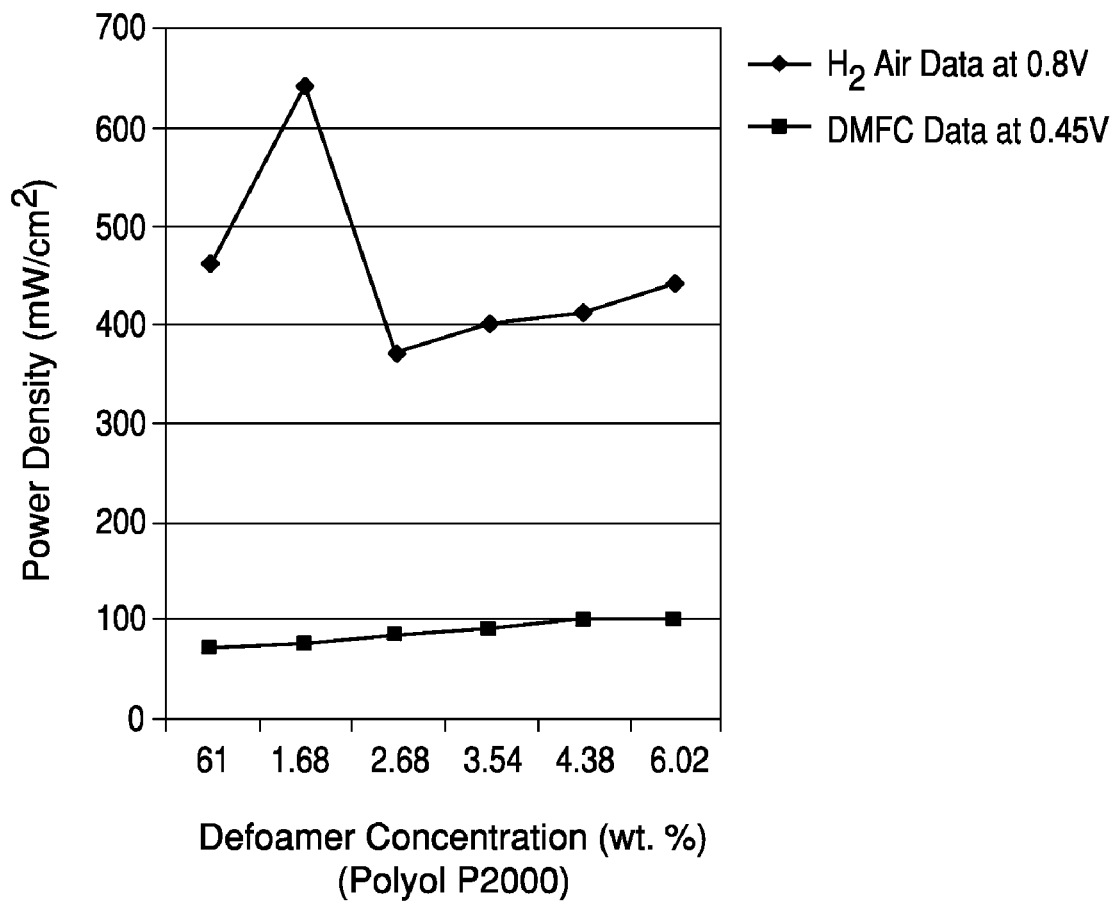
FIG. 20 presents a line graph showing the effect of defoamer concentration (and catalyst morphology) on fuel cell power densities for a DMFC MEA and a $H_2$/Air MEA.

FIG. 20 compares the relationship between power and current density for the DMFC and hydrogen air MEA's that were analyzed in Examples 1, 3-6 and 9 and the amount of defoamer (here, Polyol P2000) employed to form the catalyst particles in these examples. The data in FIG. 20 clearly shows that catalyst particles formed from precursor compositions having lower defoamer concentrations (and hence lower tap densities) performed better in the hydrogen air fuel cell MEA's than catalyst particles formed from precursor compositions having greater defoamer concentrations. The data in FIG. 20 shows the opposite relationship for DMFC MEA's. That is, catalyst particles formed from precursor compositions having greater defoamer concentrations (and hence greater tap densities) performed better in the DMFC MEA's than catalyst particles formed from precursor compositions having lower defoamer concentrations.

An example of a catalyst that was made with a composition that was substantially free of defoamer and that is irregular in shape is shown in FIG. 1 (note that a minor amount of spherical particles may be formed even with precursor compositions having a low defoamer concentration). This morphology was formed at low concentrations of defoamer (e.g., at about 0.8 weight percent or less).

As the concentration of defoamer is increased to about 1.7 weight percent, a mixture of irregularly shaped and spherically shaped (or substantially spherically shaped) catalyst particles is observed. See, for example, Example 3 and FIG. 7 for a catalyst that was made using 1.68 weight percent defoamer. When the concentration of defoamer is increased, for example, to about 2.7 weight percent, spherically shaped or substantially spherically shaped particles are observed. See, for example, Example 4 and FIG. 10 for a catalyst that was made using 2.68 weight percent defoamer. At concentrations of defoamer of 2.7 eight percent and higher, catalyst particles that are spherical in shape, or substantially spherical in shape, are observed. See, for example, Examples 5-9, above.

The results described above in Table 1 and in the Examples demonstrate that, in addition to having a morphology that is irregular in shape, catalysts made with a concentration of defoamer that is about 0.8 weight percent or less (optionally free or substantially free of defoamer), also exhibit a low tap density, a high surface area, and a high pore volume. Catalyst particles having an irregular shape are particularly suited for use as hydrogen/air fuel cell catalysts since irregular shape particles tend to exhibit greater surface area than spherical particles, and hence provide the ability to maximize active phase concentration on the support particles. This increase in active phase loading per mass support particles results in increased fuel cell performance. Further, hydrogen/air fuel cell catalyst layers are much thinner than DMFC fuel cell catalyst layers and therefore do not necessitate the large transport "gaps" between catalyst particles that are demanded by DMFC catalyst layers.

On the other hand, in addition to having a morphology that is a mixture of spherically shaped (or substantially spherically shaped) particles, catalysts made with a concentration of defoamer that is about 1.68 weight percent also exhibit a medium tap density, medium surface area, and medium pore volume. Finally, catalysts made with a concentration of defoamer that is on the order of 2.6 weight percent or higher exhibit a high tap density, low surface area, and low pore volume, in addition to being spherical in shape, or substantially spherical in shape. Catalyst particles that are spherical in shape, or substantially spherical in shape, are particularly suited for use as direct methanol fuel cell catalysts since the spherical catalyst particles in DMFC catalyst layers provide larger gaps between catalyst particles than irregularly shaped catalyst particles. These gaps facilitate transport of reactants toward the three-phase interface and products away from the three-phase interface.

In sum, if a highly irregular shape is the target morphology for a catalyst, then lower concentrations of defoamer are desired. On the other hand, if spherical, or substantially spherical is the target morphology for a catalysts, then greater concentrations of defoamer should be used. In other words, low concentrations of defoamer (e.g., less than 2 weight percent, less than 1 weight percent, or less than 0.8 weight percent) correlate with irregularly shaped catalyst morphology, while higher concentrations (e.g., greater than 2 weight percent, e.g., greater than 2.6 weight percent, or greater than 4 weight percent) correlate with a spherical or substantially spherical catalyst morphology. Mixtures of irregular and spherical catalyst particles may be achieved at concentrations of defoamer that are between 0.8 weight percent and 2.6 weight percent.

It is noted that the foregoing examples have been provided merely for the purpose of explanation and are in no way to be construed as limiting of the present invention. While the present invention has been described with reference to an exemplary embodiment, it is understood that the words that have been used are words of description and illustration, rather than words of limitation. Changes may be made, within the purview of the appended claims, as presently stated and as amended, without departing from the scope and spirit of the present invention in its aspects. Although the invention has been described herein with reference to particular means, materials and embodiments, the invention is not intended to be limited to the particulars disclosed herein. Instead, the invention extends to all functionally equivalent structures, methods and uses, such as are within the scope of the appended claims.

What is claimed is:

1. A process for forming catalyst particles having a tap density less than 0.65 g/m$^3$, the process comprising the steps of:
   (a) providing a precursor composition comprising support particles, an active phase precursor, a vehicle and less than about 2 weight percent defoamer, based on the total weight of the precursor composition;
   (b) aerosolizing the precursor composition to form a flowing stream of droplets; and
   (c) heating the flowing stream of droplets under conditions effective to vaporize the vehicle and form the catalyst particles, wherein the catalyst particles comprise an active phase disposed on the support particles.

2. The process of claim 1, wherein the catalyst particles have a tap density less than 0.60 g/m$^3$.

3. The process of claim 1, wherein the catalyst particles have a tap density less than 0.50 g/m$^3$.

4. The process of claim 1, wherein the precursor composition further comprises a dispersant.

5. The process of claim 4, wherein the dispersant comprises methylcellulose.

6. The process of claim 1, wherein the catalyst particles have a BET nitrogen surface area of from about 200 to about 500 m$^2$/g.

7. The process of claim 1, wherein the precursor composition comprises the defoamer in an amount less than about 1.2 weight percent.

8. The process of claim 1, wherein the precursor composition comprises the defoamer in an amount less than about 0.8 weight percent.

9. The process of claim 1, wherein the precursor composition comprises the defoamer in an amount less than about 0.5 weight percent.

10. The process of claim 1, wherein the precursor composition is substantially free of defoamer.

11. The process of claim 1, wherein the precursor composition comprises the defoamer in an amount greater than about 0.01 weight percent and less than about 2 weight percent.

12. The process of claim 1, wherein the precursor composition comprises the defoamer in an amount greater than about 0.01 weight percent and less than about 1 weight percent.

13. The process of claim 1, wherein the defoamer is selected from 2,5,8,11-tertamethyl-6-dodecyne-5,8-diol and a polyglycol.

14. The process of claim 1, wherein the defoamer comprises a polyol.

15. The process of claim 1, wherein the catalyst particles are suitable for use as hydrogen/air fuel cell catalyst.

16. The process of claim 1, wherein the support particles comprise carbon black.

17. The process of claim 1, wherein the active phase precursor comprises a metal-containing compound comprising a metal selected from the group consisting of nickel, cobalt, iron, copper, manganese, chromium, ruthenium, rhenium, molybdenum, tungsten, vanadium, zinc, titanium, zirconium, tantalum, iridium, platinum, palladium and gold.

18. The process of claim 1, wherein the precursor composition is high shear mixed prior to the aerosolizing.

19. A process for forming catalyst particles having a target morphology, the process comprising the steps of:
(a) providing a correlation between defoamer concentration and catalyst particle morphology;

(b) determining an amount of defoamer to include in a precursor composition to obtain the target morphology based on the correlation;

(c) preparing a precursor composition comprising support particles, an active phase precursor, a vehicle and a defoamer, wherein the amount of defoamer included in the precursor composition is determined in the determining step;

(d) aerosolizing the precursor composition to form a flowing stream of droplets; and (e) heating the flowing stream of droplets under conditions effective to vaporize the vehicle and form the catalyst particles, wherein the catalyst particles comprise an active phase disposed on the support particles and have the target morphology.

20. The process of claim 19, wherein the catalyst particles have a tap density less than 0.65 $g/m^3$.

21. The process of claim 19, wherein the catalyst particles have a tap density greater than 0.60 $g/m^3$.

22. The process of claim 19, wherein the catalyst particles have a tap density greater than 0.50 $g/m^3$.

23. The process of claim 19, wherein the precursor composition further comprises a dispersant.

24. The process of claim 23, wherein the dispersant comprises methylcellulose.

25. The process of claim 19, wherein the catalyst particles have a BET nitrogen surface area of from about 200 to about 500 $m^2/g$.

26. The process of claim 19, wherein the precursor composition comprises the defoamer in an amount less than about 1.2 weight percent.

27. The process of claim 19, wherein the precursor composition comprises the defoamer in an amount less than about 0.8 weight percent.

28. The process of claim 19, wherein the precursor composition comprises the defoamer in an amount less than about 0.5 weight percent.

29. The process of claim 19, wherein the precursor composition is substantially free of defoamer.

30. The process of claim 19, wherein the precursor composition comprises the defoamer in an amount greater than about 0.01 weight percent and less than about 2 weight percent.

31. The process of claim 19, wherein the precursor composition comprises the defoamer in an amount greater than about 0.01 weight percent and less than about 1 weight percent.

32. The process of claim 19, wherein the defoamer is selected from 2,5,8,11-tertamethyl-6-dodecyne-5,8-diol and a polyglycol.

33. The process of claim 19, wherein the defoamer comprises a polyol.

34. The process of claim 19, wherein the catalyst particles are suitable for use as a hydrogen/air fuel cell catalyst.

35. The process of claim 19, wherein the catalyst particles are suitable for use as a direct methanol fuel cell catalyst.

36. The process of claim 19, wherein the support particles comprise carbon black.

37. The process of claim 19, wherein the precursor composition is high shear mixed prior to the aerosolizing.

38. The process of claim 19, wherein the active phase precursor comprises a metal-containing compound comprising a metal selected from the group consisting of nickel, cobalt, iron, copper, manganese, chromium, ruthenium, rhenium, molybdenum, tungsten, vanadium, zinc, titanium, zirconium, tantalum, iridium, platinum, palladium and gold.

39. A process for forming catalyst particles having a tap density greater than 0.65 $g/m^3$, the process comprising the steps of:

(a) providing a precursor composition comprising support particles, an active phase precursor, a vehicle and at least about 2 weight percent defoamer, based on the total weight of the precursor composition;

(b) aerosolizing the precursor composition to form a flowing stream of droplets; and (c) heating the flowing stream of droplets under conditions effective to vaporize the vehicle and form the catalyst particles, wherein the catalyst particles comprise an active phase disposed on the support particles.

* * * * *